Figure 12:
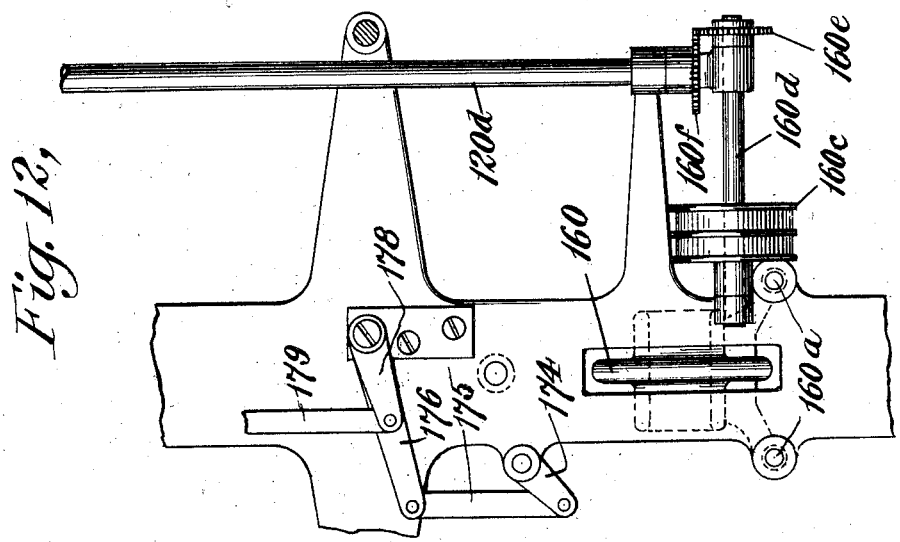

H. T. GOSS & J. W. BRYCE.
TIME RECORDER.
APPLICATION FILED JUNE 19, 1912.

1,043,094.

Patented Nov. 5, 1912.

14 SHEETS—SHEET 1.

WITNESSES

INVENTORS
H. T. Goss
J. W. Bryce

BY
Kerr, Page, Cooper & Hayward
ATTORNEYS

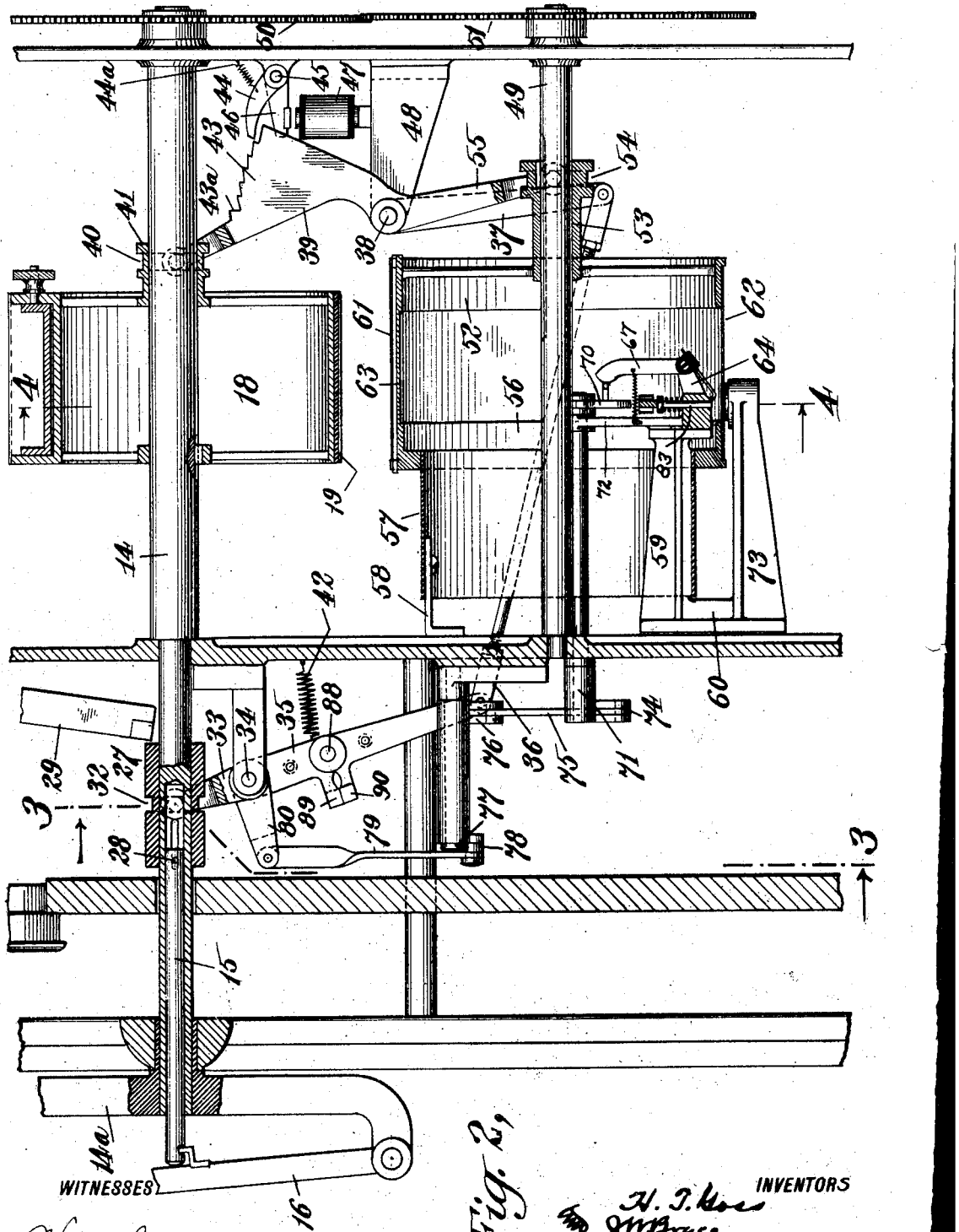

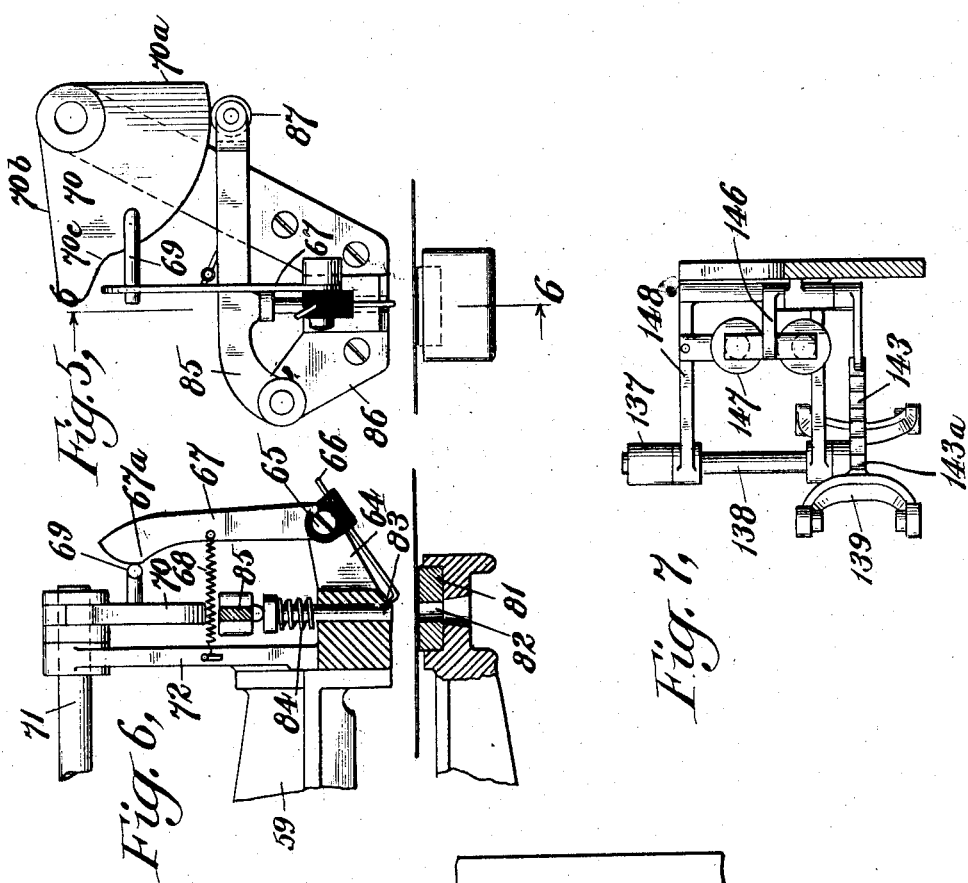

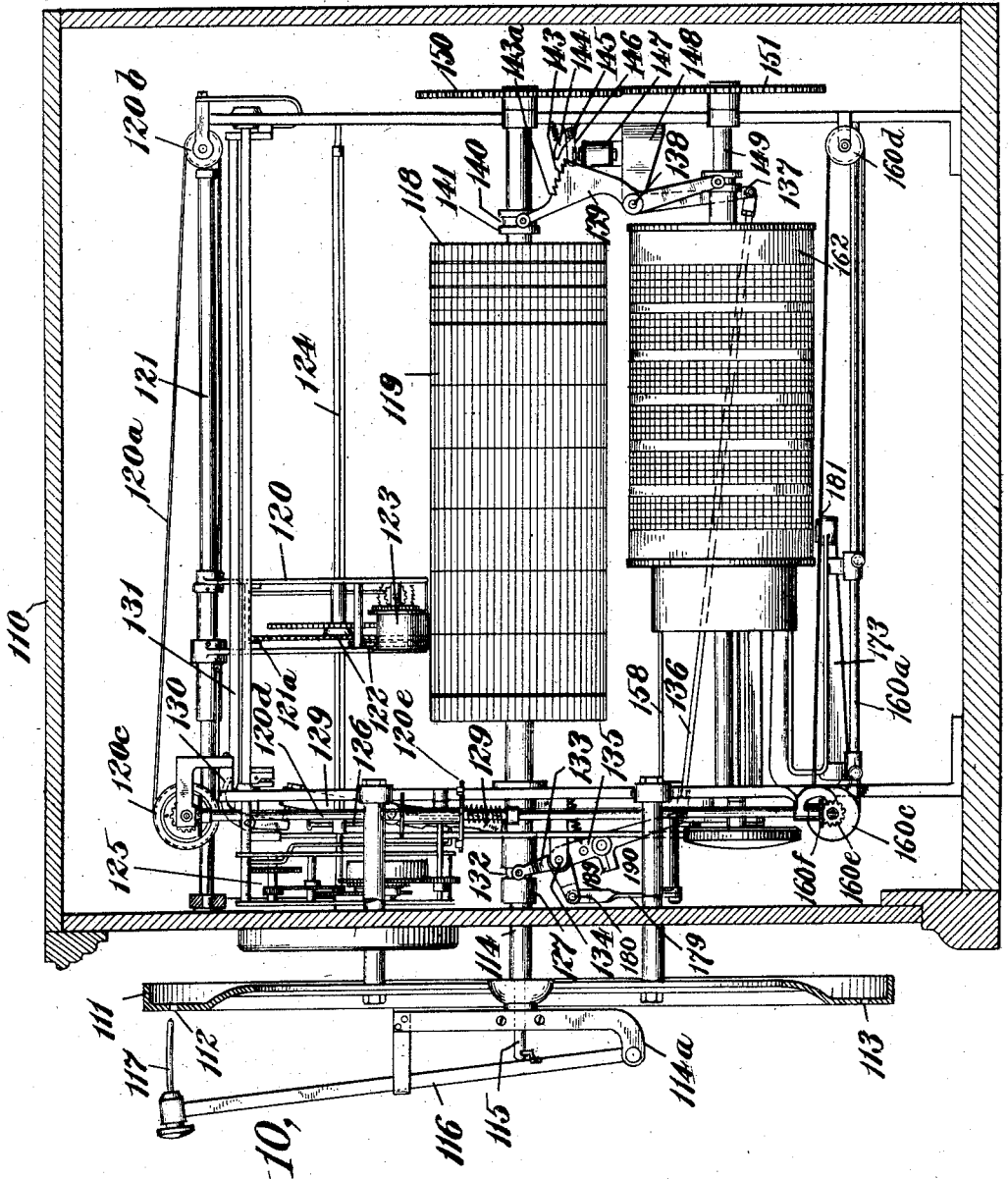

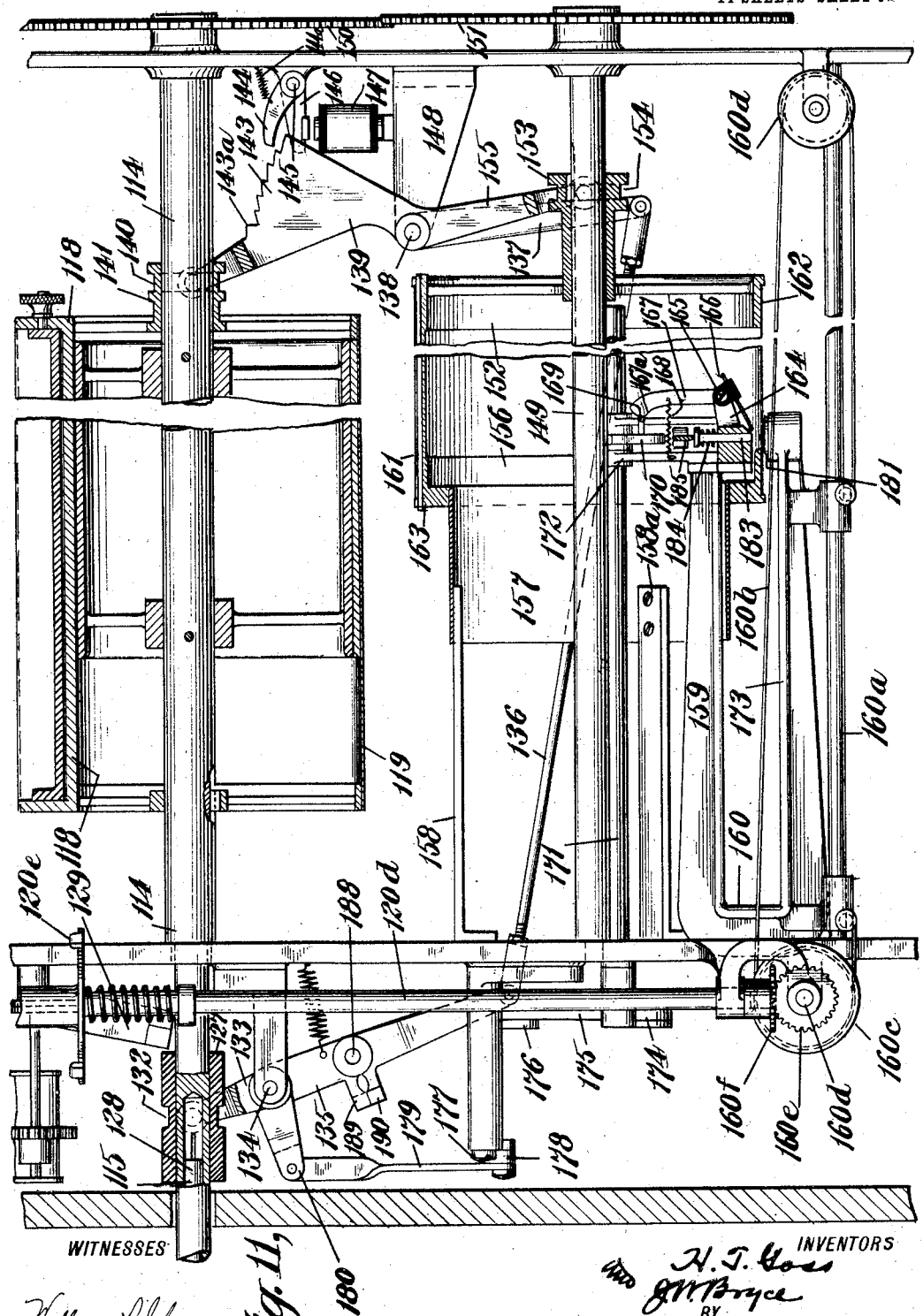

H. T. GOSS & J. W. BRYCE.
TIME RECORDER.
APPLICATION FILED JUNE 19, 1912.
1,043,094.
Patented Nov. 5, 1912.
14 SHEETS—SHEET 7.
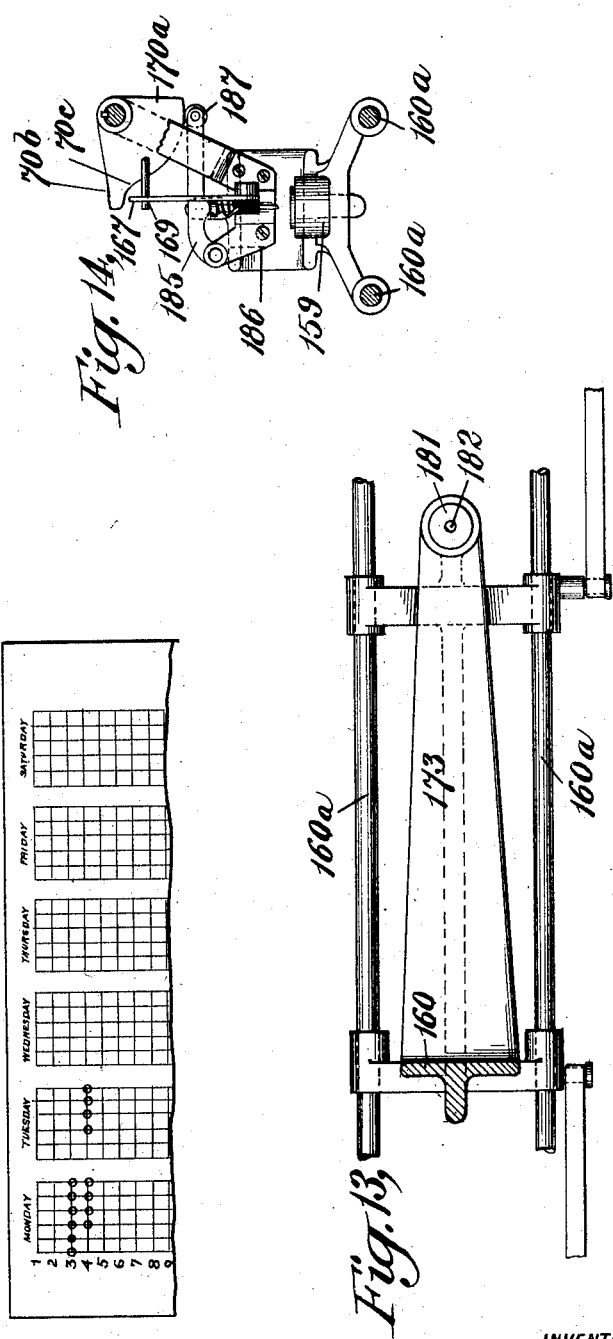
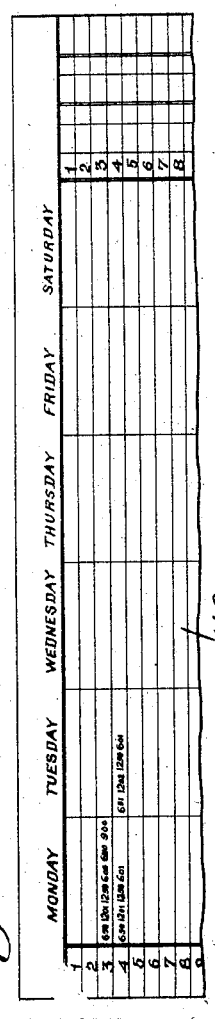
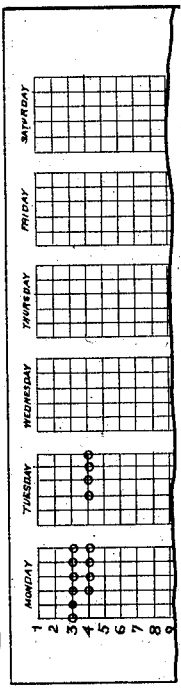
WITNESSES
INVENTORS
BY
ATTORNEYS

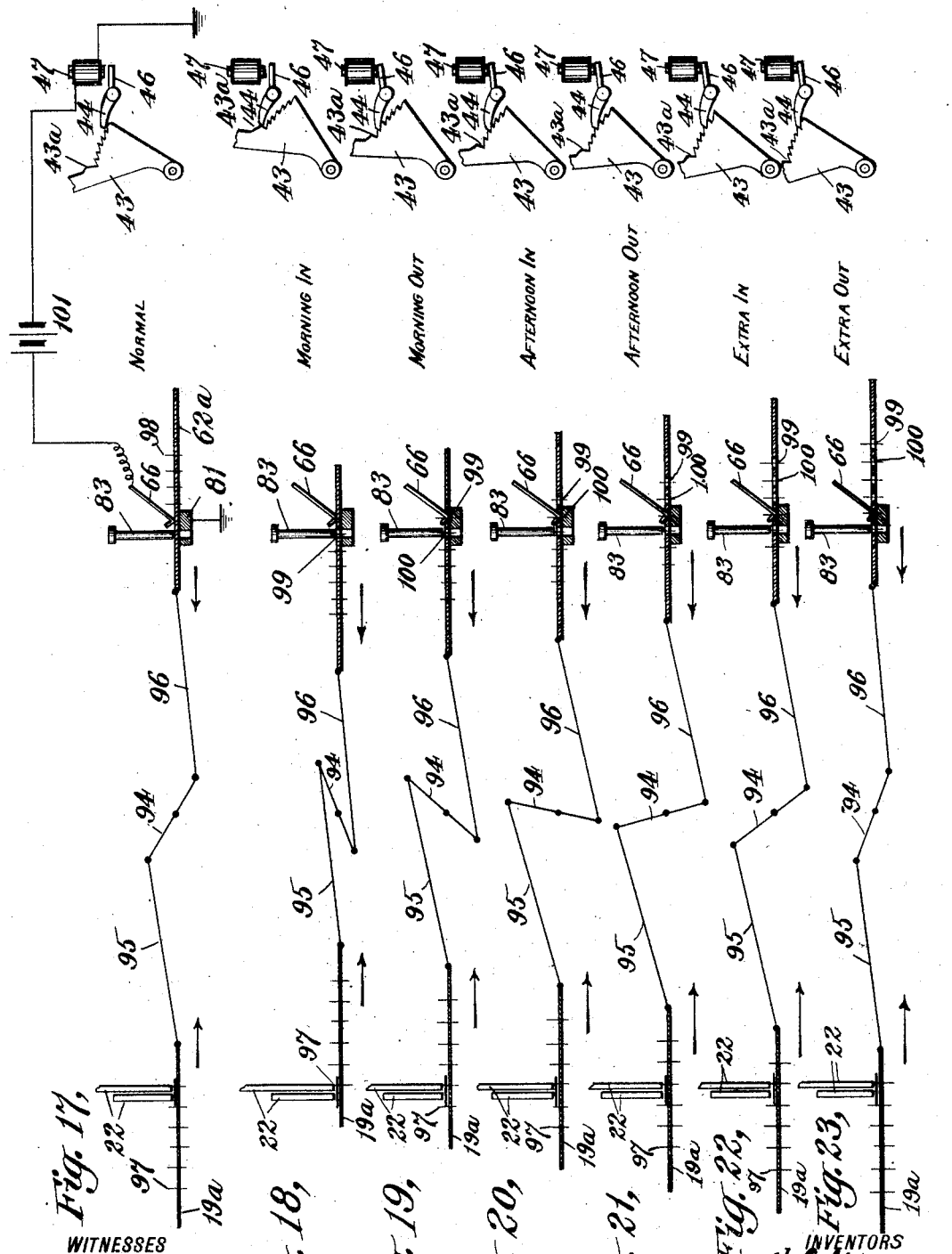

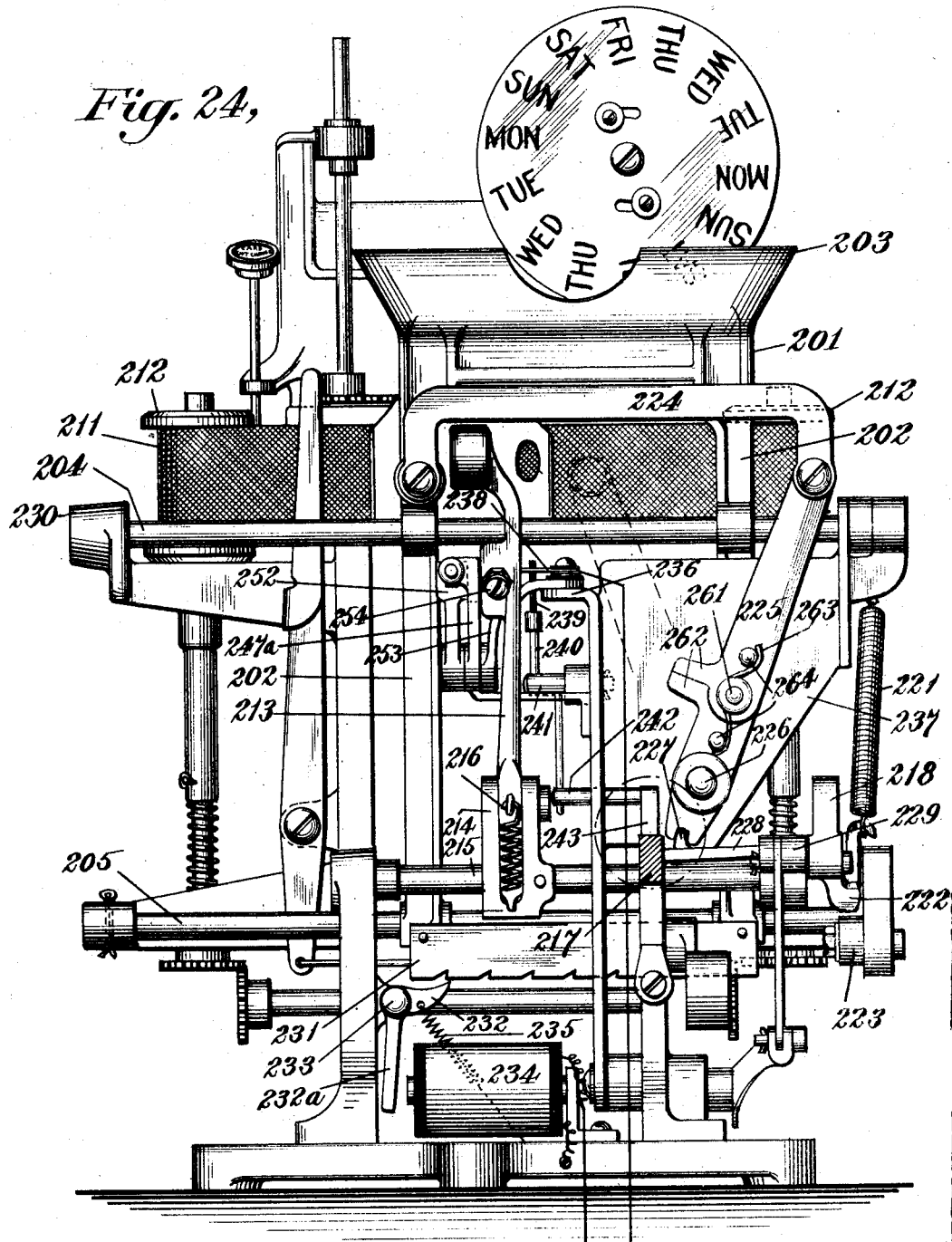

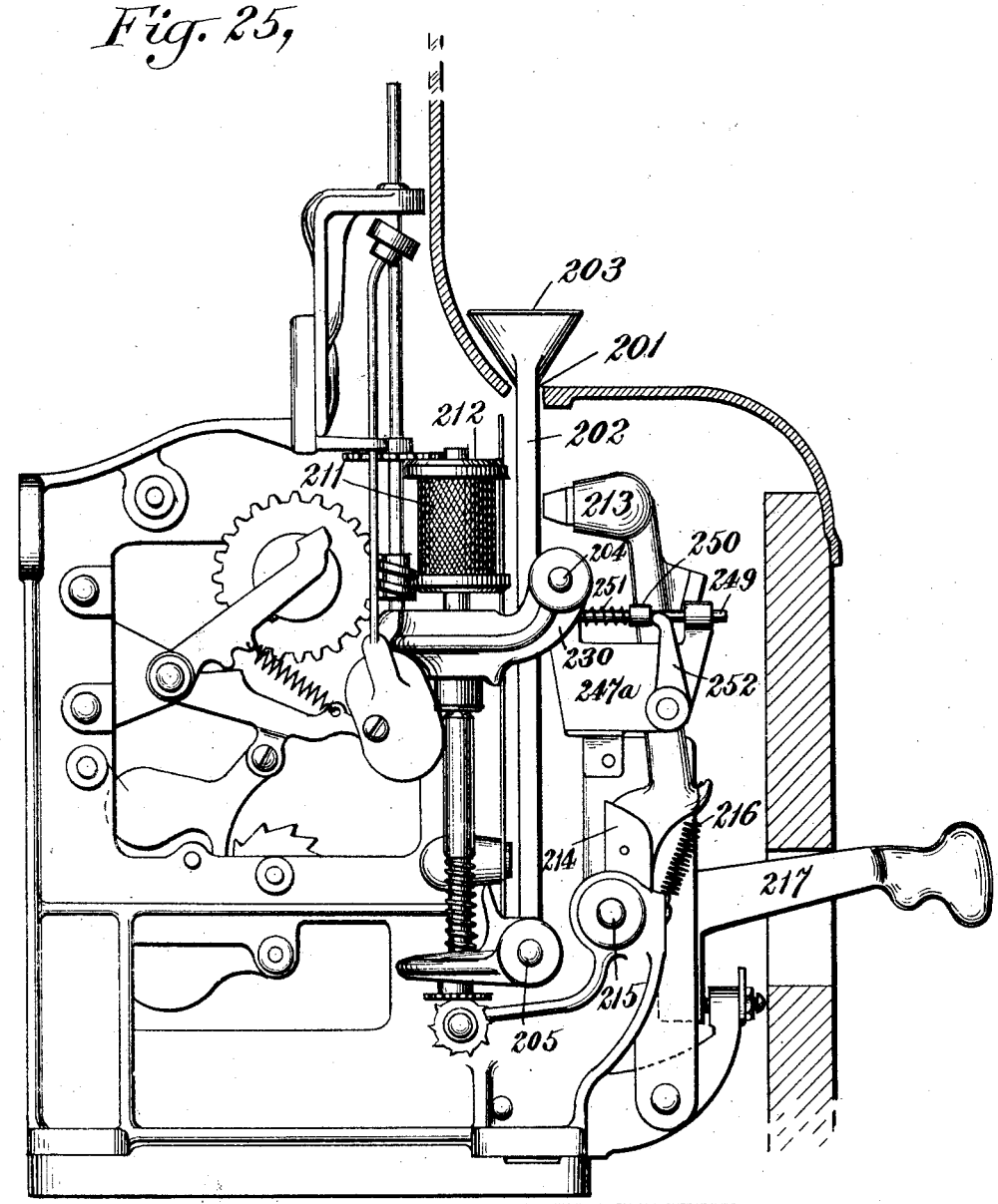

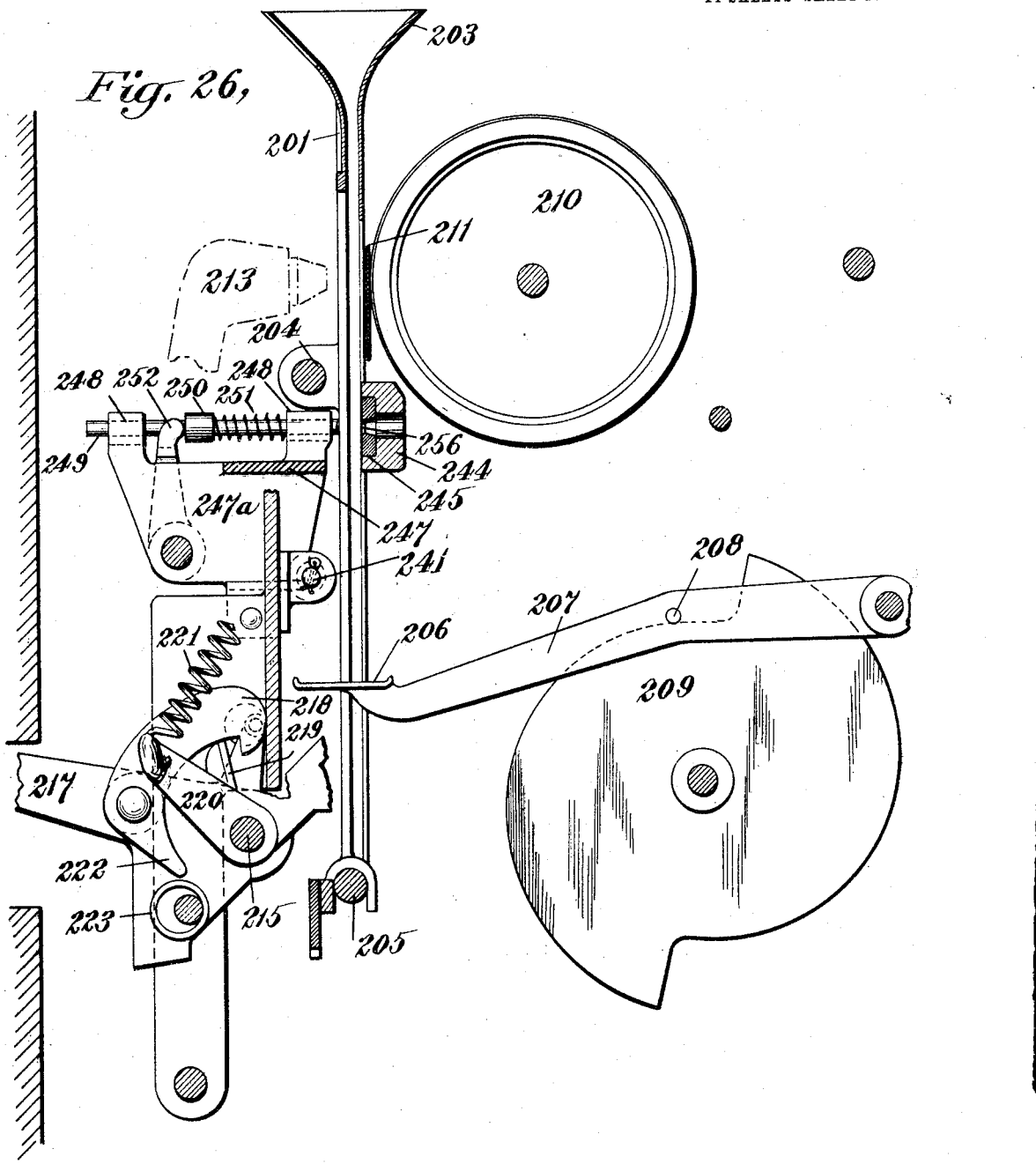

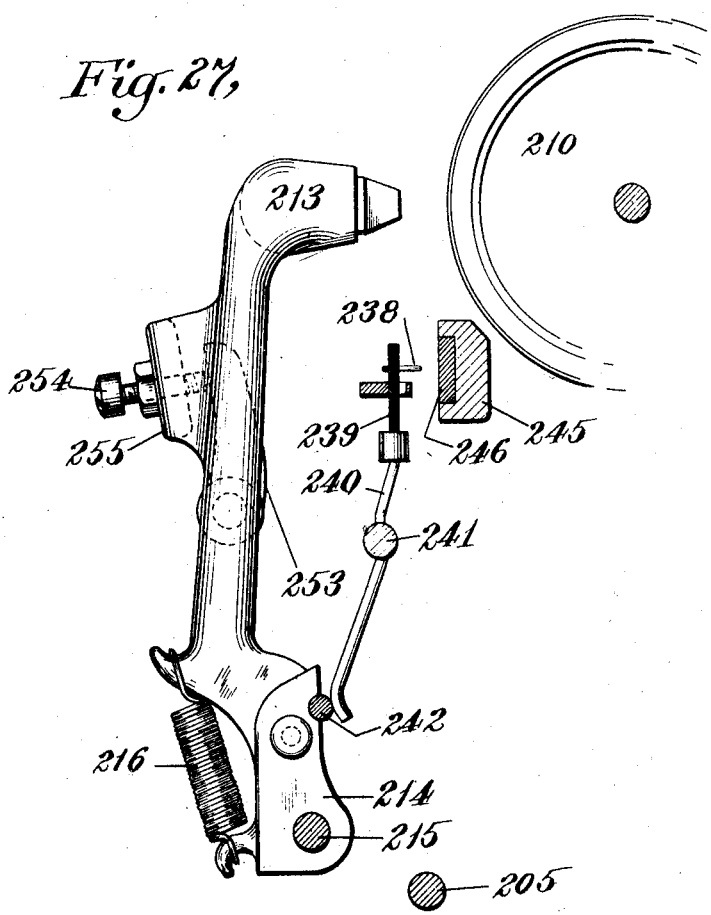
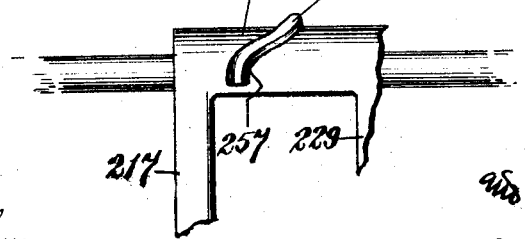

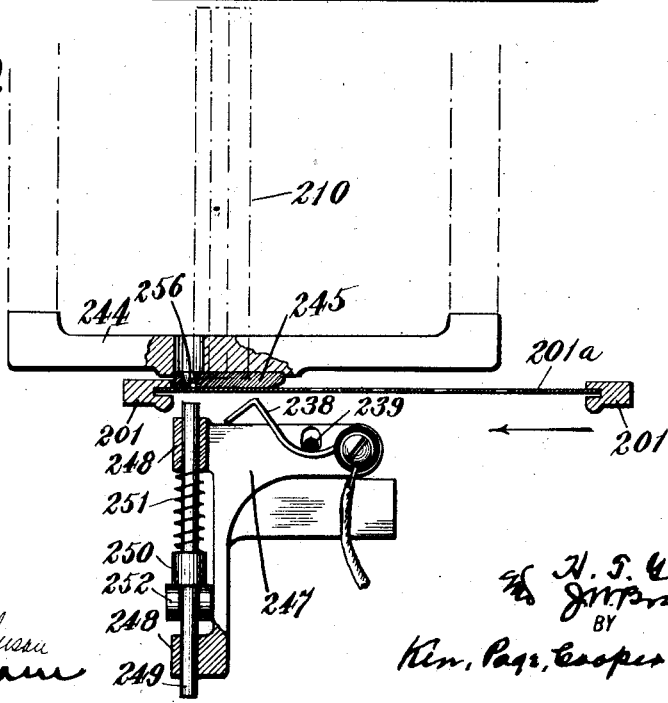

H. T. GOSS & J. W. BRYCE.
TIME RECORDER.
APPLICATION FILED JUNE 19, 1912.
1,043,094.
Patented Nov. 5, 1912.
14 SHEETS—SHEET 14.
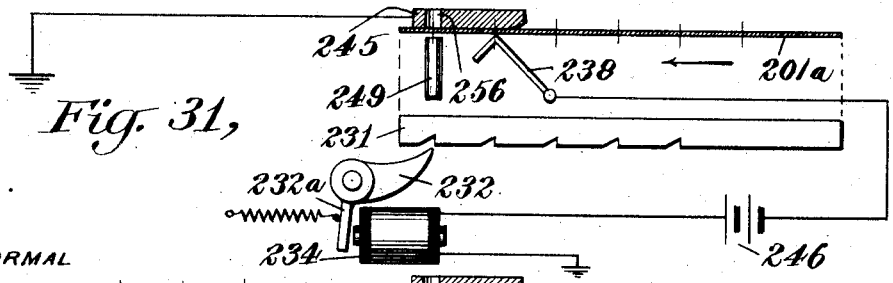
Fig. 31,
NORMAL
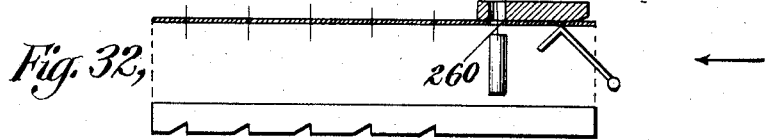
Fig. 32,
MORNING IN
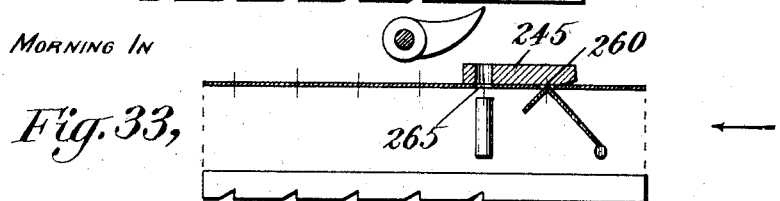
Fig. 33,
MORNING OUT
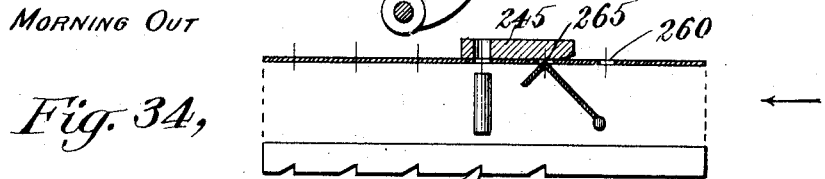
Fig. 34,
AFTERNOON IN
Fig. 35,
AFTERNOON OUT
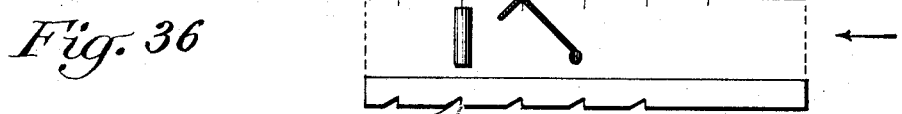
Fig. 36
EXTRA IN
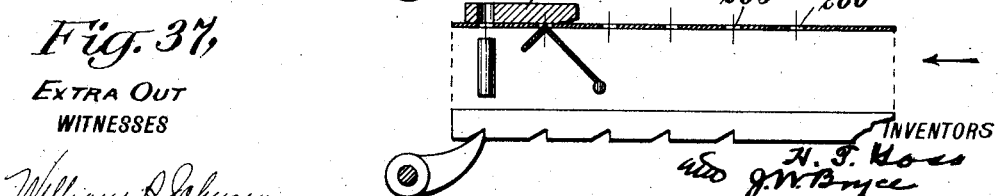
Fig. 37,
EXTRA OUT
WITNESSES
INVENTORS
BY
ATTORNEYS

UNITED STATES PATENT OFFICE.

HARRY T. GOSS, OF RUTHERFORD, AND JAMES W. BRYCE, OF BLOOMFIELD, NEW JERSEY.

TIME-RECORDER.

1,043,094. Specification of Letters Patent. Patented Nov. 5, 1912.

Application filed June 19, 1912. Serial No. 704,504.

*To all whom it may concern:*

Be it known that we, HARRY T. GOSS and JAMES W. BRYCE, citizens of the United States, residing, respectively, at Rutherford, Bergen county, New Jersey, and Bloomfield, Essex county, New Jersey, have invented certain new and useful Improvements in Time-Recorders, of which the following is a full, clear, and exact description.

In time recorders employed to record the times of arrival and departure of workmen it is of course necessary that the record sheet or card, or the time-printing wheels, be shifted, one with respect to the other, at the proper instant to cause each record-imprint to be made on an unprinted space on the sheet. It has heretofore been proposed to produce this shifting movement by or under the control of the clock, the arrangement being such that the desired movement will occur at certain definite times during the day. Thus, for example, up to a certain hour, say 7:00 a. m., the imprints will all be made in the arrival or "morning in" spaces. Then at 12:00 m. one of the elements of the printing couple is shifted, so that imprints made by the workmen going out for lunch will be made in the "noon out" spaces; subsequent adjustments of one element relatively to the other providing for the "noon in", "afternoon out", "night in", and "night out" records.

Our present invention differs radically from this scheme, in that while we provide relative adjustment or shift of the printing elements to accomplish the "in" and "out" spacing, the adjustment is not effected by or under the control of the clock but occurs for each workman whenever he registers, no matter what the time of day may be. Thus, when a workman arrives in the morning his record is made in his morning-in space. The next time he registers, even if immediately after the first, the resulting imprint will be made in another space—usually considered the morning-out or noon-out space—and so on throughout the day. On the other hand another workman, who arrives after the second registration of a man who preceded him, will register in his morning-in space. In other words the adjustment is effected for the workmen separately and not collectively. This means that each time a registration is made the imprint is made on a fresh or unprinted space on the record sheet, and hence no previously printed record can be obliterated or rendered illegible by repeated operations of the machine.

While our invention is adaptable to time recorders of any type in which there is provision for relative adjustment of the elements of the printing couple to accomplish the "in and out" spacing we have shown the invention herein as applied only to two types, to wit, a "dial" machine and a "card" machine. In the first of these types or classes the time records of a plurality of workmen are made on a single sheet, each workman having a line appropriated to his own records. This record sheet is usually mounted on a cylindrical drum which is revolved by a pointer or index lever on the outside of the casing of the machine to bring the different lines to the impression. When the workman has turned the index lever to his number on the dial, thereby bringing his line to the impression point, the printing is effected, usually by suitable actuation of the index lever. In some machines of this class the record sheet contains only a single day's records and hence is commonly called a "daily" machine. Other dial machines have provision for several days, usually six or seven, records on the same sheet, and are commonly known as weekly machines. In "card" machines as usually constructed each workman has his own record sheet or card, which is devoted exclusively to his own record and is usually in the form of a card with provision for one or two week's records.

One form of the invention as applied in the preferred manner to the time recorders briefly outlined above is illustrated in the accompanying drawings, in which—

Figure 1:
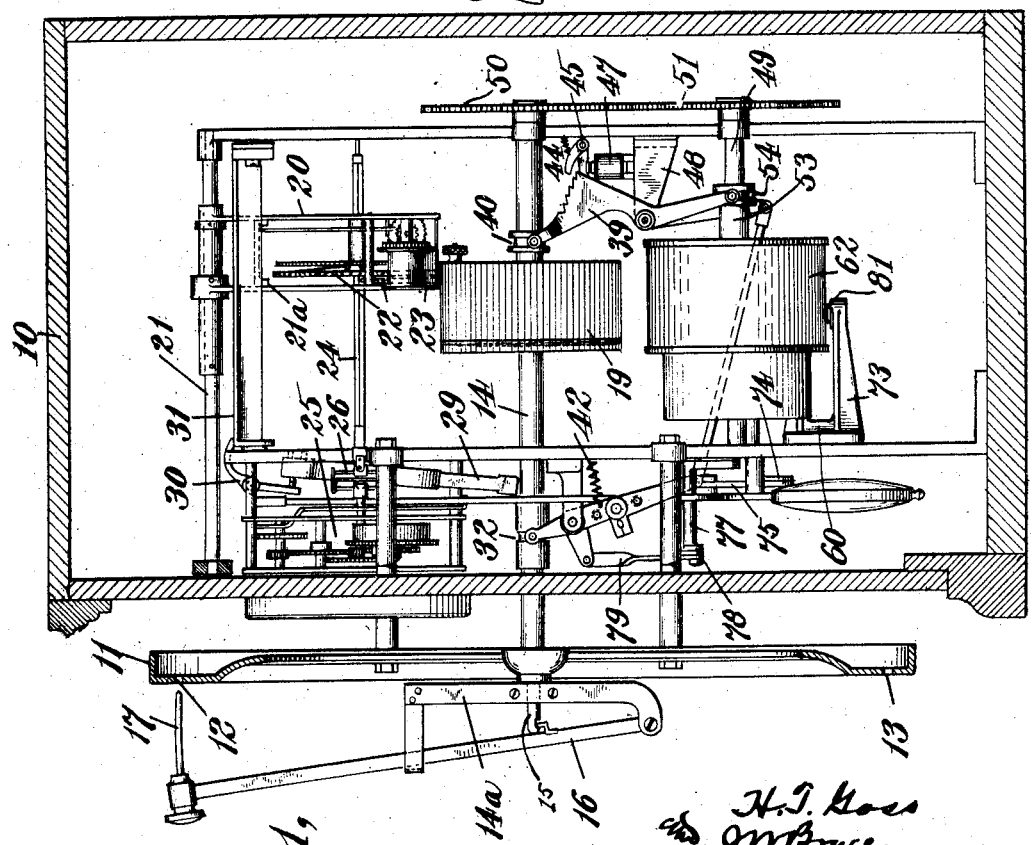
Figure 4:
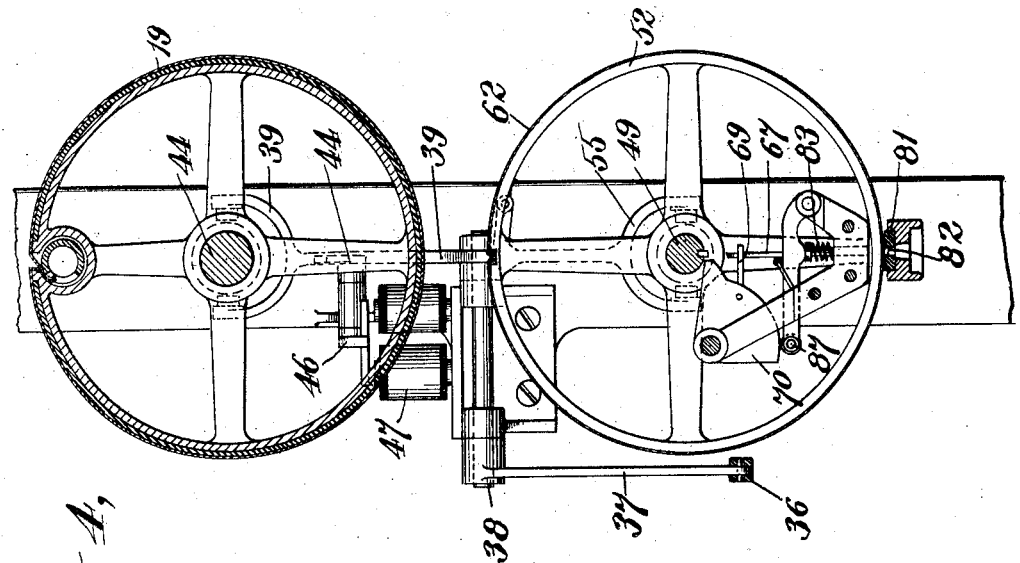
Figure 3:
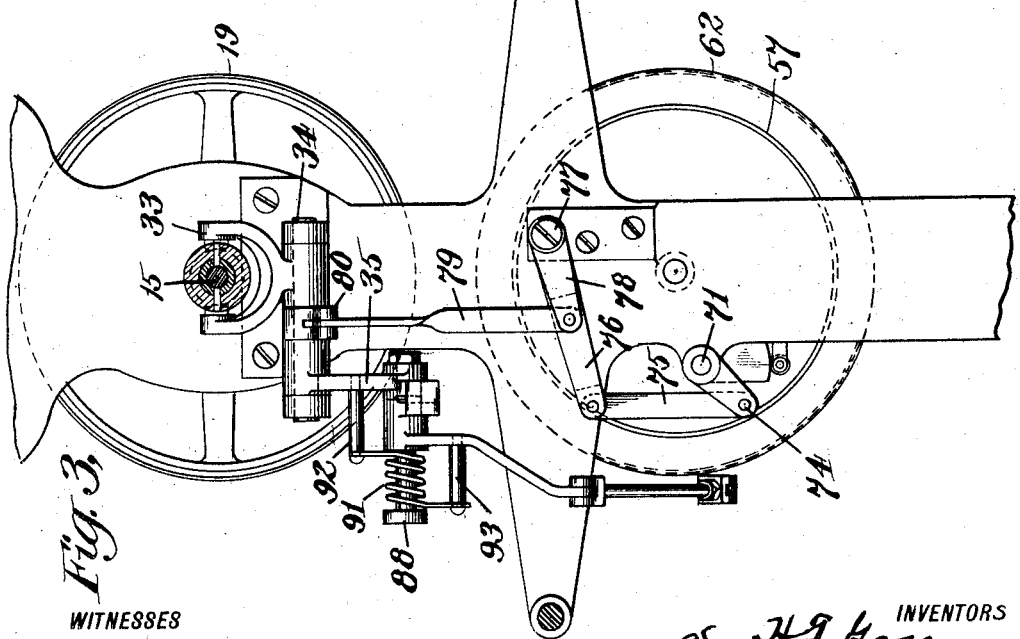

Figure 1 shows in vertical section a daily dial machine of well known construction, with our invention incorporated in it. Fig. 2 is a detail sectional view on the same plane as that of Fig. 1, omitting the clock and the printing or type-wheel carriage. Figs. 3 and 4 are detail cross sections on lines 3—3 and 4—4 of Fig. 2, looking in the direction of the arrows in each case. Fig. 5 is a detail end view of the punching mechanism and the electrical contact devices by which the in-and-out adjustment of the printing couple is controlled. Fig. 6 is a section on line 6—6 of Fig. 5. Fig. 7 is a plan view of the magnet and associated parts by which the movable element of the printing couple is arrested. Fig. 8 shows a portion of the record sheet of a daily dial machine such as that illustrated in Fig. 1, and Fig. 9 shows a portion of the punched adjustment-controlling sheet or card which coöperates with the electrical mechanism to control the in-and-out movement of the adjustable member of the printing couple. Fig. 10 is a vertical section of a dial machine of the weekly type, with our invention applied thereto. Fig. 11 is a detail vertical section on the same plane as that of Fig. 10, with the clock and the printing or type-wheel carriage omitted. Fig. 12 ( on Sheet 1) is a detail front view of the mechanism and the electrical contact devices in unison with the in-and-out spacing movement of the record sheet. Fig. 13 is a sectional plan view of the sliding carriage which carries the punching mechanism and the electrical contact devices. Fig. 14 is a detail rear view of the punching mechanism and the electrical contact devices. Fig. 15 shows a portion of the usual form of record sheet used with a weekly machine of the dial type, and Fig. 16 shows a portion of the adjustment controlling sheet or card which coöperates with the electrical mechanism to control the in-and-out movement of the adjustable member of the printing couple. Fig. 17 is a diagrammatic sectional view showing the normal or initial position of the time-record sheet, the adjustment-controlling or auxiliary record sheet, the punching mechanism and the contact devices, and the electromagnetically actuated mechanism for arresting the auxiliary record sheet. This figure also shows the electrical circuit of the mechanism last mentioned. Figs. 18, 19, 20, 21, 22, and 23 show the same parts as are shown in Fig. 17, but in the positions of, respectively, morning-in, morning-out, afternoon in, afternoon out, extra-in, and extra-out. Fig. 24 is a front view of the recording mechanism of a time recorder of the card type, the particular machine illustrated being that described in the patent of Clinton E. Larrabee, No. 935,312, issued Sept. 28, 1909, to which reference may be made for explanation of any parts shown in the figure but not mentioned in this specification. Fig. 25 is a detail view of the mechanism shown in Fig. 24, looking from the left. Fig. 26 is a detail vertical section showing the punching mechanism, the abutment or card-lift which rises at daily intervals to limit the depth to which the record cards of the different workmen can be inserted in the card chute or receiver. This figure also shows part of the mechanism which actuates the printing hammer. Fig. 27 is a detail side view partly in vertical section, showing the connection of the printing hammer with the electrical contact mechanism to actuate the latter. Fig. 28 is a detail plan view of the cam member which serves to shift the card receiver for the purpose of effecting the in-and-out spacing. Fig. 29 is a detail sectional plan view of the punching mechanism and electrical contact devices. Fig. 30 shows a record card of the kind usually employed with a time recorder of the card type. Fig. 31 is a diagrammatic sectional view showing the normal or initial position of the record card, the punching mechanism, and contact devices, and the electromagnetically actuated mechanism for arresting the card receiver or chute in its in-and-out movement. Figs. 32, 33, 34, 35, 36, and 37 are diagrammatic views of the same parts, showing the same in the positions of, respectively, morning-in, morning-out, afternoon-in, afternoon-out, extra-in, and extra-out.

Referring now to Figs. 1 to 7 inclusive, the machine illustrated therein comprises, in general, a casing 10 having on its front an annular dial 11 provided with an annular series of apertures, two of which are shown at 12, 13. At the center of this series of apertures is a shaft 14 extending toward the back of the machine and having an arm 14ª rigidly fixed to it at its front end, outside the casing. The front end of the shaft is tubular and mounted therein is a sliding stem 15 having at its outer end a notch to engage a bent finger on the adjacent portion of an index lever 16 pivoted at one end to the arm 14ª and at its other end having a rearwardly extending finger 17 adapted to enter any of the apertures, in the dial 11, to which it may be presented by revolving the index lever and then pressing the same inwardly or toward the rear of the machine.

The apertures in the dial 11 are numbered, and to each workman is assigned a number. Inside the machine is a drum 18, mounted to slide on the shaft 14 but to revolve therewith. Wrapped around this drum and clamped tightly in any convenient manner is a record sheet 19 bearing a circumferential column of workmen's numbers, the sheet being so placed on the drum that when any employee revolves the drum by means of the index or handle 16 to bring the pointer or finger 17 into register with the aperture corresponding to his number on the dial his number and line on the record sheet will be brought to the impression point.

The other element of the printing couple comprises a carriage 20 suspended from the rod 21 above the record drum and having a vertically movable frame indicated at 21ª. This frame carries the time printing wheels 22 and the ink ribbon 23, the time printing wheels being mounted on a longitudinal shaft 24 connected to the hour arbor of the clock 25 by means of a yielding joint 26 of suitable character to permit the said frame to be depressed and thereby make an imprint or time record on the record sheet.

On the shaft 14 near the front of the machine is a sliding collar 27 connected by a pin 28 to the sliding stem 15 through slots in the tubular portion of the shaft. When the workman pushes the index or finger 17 into the dial aperture to which his number is appropriated the inward movement of the stem slides the collar rearwardly on the shaft 14, thereby actuating a vertical lever 29 whose lower end lies in the path of the collar. The upper end of this lever engages and actuates a bent vertical lever 30 the upper end of which overhangs and engages a swinging frame 31 which in turn engages and depresses the printing frame 21ᵃ and so causes a time record to be made on the record sheet, as already described.

For the purpose of effecting the in-and-out spacing of the recorder, one or the other element of the printing couple—in the present case the drum—is made axially adjustable past the other, and means for so adjusting the movable element are provided as follows: The collar 27 is provided with a circumferential groove 32 engaged by a yoke or forked arm 33 fixed on a short transverse shaft 34 below the collar. Fixed to the same shaft is a depending arm 35, the two arms 33—35 constituting in effect a single lever. At its lower end the lever 33—35 is pivotally connected to a rearwardly extending link 36 pivoted at its rear end to an arm 37 fixed to and depending from one end of a transverse rock shaft 38. Fixed to the other end of the shaft is an upwardly extending arm 39 (the arms 37—39 constituting in effect a single lever, like the arms 33—35 mentioned above) forked at its upper end and engaging a circumferential groove 40 in the hub 41 of the time record drum 18. It will now be seen that when the handle 16 is pressed inwardly by the workman the rearward movement of the collar 27 will cause a rearward axial movement of the time record drum, and of course with it the time record sheet, through the instrumentality of the levers 33—35, 37—39, and the link 36. It will also be seen that the drum will be shifted each time the collar 27 is actuated by the printing lever or manual 16, and that when the said lever is released the spring 42 will retract the moving parts to the normal or initial position shown in Fig. 1.

The normal or initial position of the time record drum 18 being that shown in Fig. 1, with the rear side of the record sheet at the impression point, it is evident at the first registration by each workman in the morning the drum should be shifted forwardly a distance nearly equal to the width of the record sheet so as to place the first registration or time record for each man adjacent to the workman's numbers, and that succeeding adjustments for the same workman should be successively less in extent in order to space the records,—in other words, to effect the in-and-out spacing. To provide for these adjustments of successively less extent the arm 39, or upper portion of the lever 37—39, is formed with an arc-shaped or segmental rack 43, having six teeth corresponding to the six time records which can be made by the machine for each workman. Coöperating with this rack is a forwardly extending pawl 44 fixed on a short transverse rock shaft 45 to which is also fixed a finger 46 constituting the armature of an electromagnet 47 conveniently mounted on the bracket 48 in which the rock shaft 38 is journaled and to one side of the path of the arm 39. It will now be seen that if this magnet is energized the pawl 44 will be depressed into engagement with one or another of the teeth on the rack 43 and that the pawl will then arrest or hold against rearward movement the arm 39 and time record drum 18. The particular tooth engaged by the pawl, and hence the point at which the drum is arrested or held, depends, of course, upon the instant at which the magnet is energized.

The construction and arrangement of the parts illustrated is such that to arrest the drum at the morning-in position, that is, its extreme rearward position, the magnet 47 need not be energized, the last tooth 43ᵃ on the rack 39 being made high enough to engage the pawl 44 in the uppermost position of the latter, which by virtue of the spring 44ᵃ it assumes when the magnet is deënergized. For the purpose of closing the magnet circuit at the proper instants to avoid arrest or hold the drum at other points in its path the following devices are provided: Below and parallel to the shaft 14 which carries the time record drum 18 or, as it may be appropriately termed, the main record drum in contradistinction to the auxiliary record drum now to be described, is a similar shaft 49 connected to shaft 14 by gears 50, 51 so as to turn synchronously with the former shaft but in the opposite direction. Mounted to slide axially on the shaft 49 but revolve therewith is a ring 52 having a hub 53 provided with a circumferential groove 54 engaged by the forked lower end of an arm 55 depending from and fixed to the short transverse shaft 38, which, it will be remembered, is rocked by the inward movement of the index or printing handle 16. Consequently the ring 52 must move forwardly as the main record drum 18 moves rearwardly, and vice versa. Facing the ri 52 and encircling the shaft 49 is a similar ring 56 of exactly the same external diameter as the former but not hubbed on the shaft. Instead, the ring is revolubly and slidably mounted on a hollow cylindrical support 57, supported at the top by a bracket 58 and at the bottom by the upper arm 59 of a rearwardly extending two-armed bracket 60. The two rings are connected at one point in their periphery by a deeply grooved channel member 61. Around the two rings is wrapped the auxiliary record sheet 62, preferably a sheet or card of somewhat heavier or thicker stock than the main record sheet 19, the two ends of the auxiliary record sheet being bent down into the channel member 61 and secured tightly therein by a flat bar or strip 63 which may be removed when it is desired to replace the old record sheet with a fresh one. The rings 52, 56 being connected by the channel 61 and by the tightly fitting auxiliary record sheet it will be seen that the two rings, and with them the record sheet, revolve and slide axially in unison or as one piece. The rings therefore constitute in effect a single drum and can be appropriately referred to as the auxiliary record drum.

The upper arm 59 of the two-armed bracket 60 is provided at its rear end with an alined lug 64 carrying at its rear end a pivot 65, and fixed to this pivot but insulated therefrom is a yielding electrical contact or brush 66 extending rearwardly and forwardly into juxtaposition to the auxiliary record sheet 62. Fixed to the same pivot and extending upwardly is a finger 67 urged forwardly by a coil spring 68, the tendency of the spring being therefore to depress the contact 66 into engagement with the inner surface of the auxiliary record sheet. This movement of the contact is normally prevented, however, by a movable stop 69 on a quadrantal cam 70 fixed to the rear end of a rock shaft 71 which extends from the front of the machine rearwardly through the drum-supporting cylinder 57 and is at its rear end journaled in a standard 72 rising from the bracket arm 59. Hence when the shaft 71 is rocked (counterclockwise as viewed in Fig. 5) the stop 69 will be carried below the forwardly extending cam edge 67ª of the finger 67, permitting the spring 68 to swing the finger forwardly and depress the contact 66 into engagement with the auxiliary record sheet. The shaft 71 at its forward end is provided with an arm 74 pivotally connected by a link 75 to an arm 76 on a stub shaft 77 which has also an arm 78 pivotally connected by a link 79 to an arm 80 fixed on the transverse rock shaft 34, which, it will be remembered, is rocked whenever the printing handle or index lever 16 is pressed to make a time record. Consequently the shaft 71 is rocked and the contact 66 depressed at each printing actuation of the handle 16.

On the end of the lower arm 73 of the two-armed bracket 60 (which latter straddles the auxiliary record drum and sheet, as shown in Fig. 2) is a metal plate or disk 81, constituting a second electrical contact. The two contacts being in circuit the electromagnet and the source of energizing current therefor, it will be seen that if, when the contact 66 is depressed, it finds in the path of its lower end an opening or hole in the auxiliary record sheet it will impinge on the second contact 81, thereby closing the circuit and causing energization of the magnet 47, with consequent actuation of the arresting pawl 44 and stoppage of the main record drum (as previously described) at a point in its path dependent upon the position of the hole in the auxiliary record sheet. Preferably the proportions of the parts which produce the axial reciprocation of the auxiliary record drum and the release of the finger 67 are such in general as to release the latter and permit the contact 66 to be depressed at practically the instant the said drum begins to move and before the hole in the auxiliary record sheet reaches the contact. The chief advantage of this arrangement is that at each operation the auxiliary record sheet rubs on the engaging end of the contact 66 as well as on the face of the second contact 81. The coöperating portions of these parts are thus kept clean and bright and good electrical contact between the two is insured.

For the purpose of providing holes in the auxiliary record sheet at proper distances apart, to permit coöperation of the contacts 66—81 and consequent arrest of the record drums as the same are moved axially by the printing handle 16 the following devices are provided: The lower contact 81 is provided with an opening 82 and in addition to acting as an electrical contact serves as the female member of a punching die. Mounted in the upper arm 59 of the bracket 60 is a vertically movable stem 83, in alinement with the opening 82 and constituting the male member of the punching die. The member 83 is normally held in upper position by an encircling coil spring 84 but its upper end is engaged by a lever 85 pivoted at one end to a bracket 86 on the arm 59 and at its other end provided with an anti-friction roller 87 bearing against the edge of the quadrantal or segmental cam 70. The radius of this cam from the leading edge 70ª to a point adjacent to the following edge 70ᵇ is constant; but at the point referred to, the radius increases, producing an incline 70ᶜ, beyond which the radius of the curved edge is again constant. Consequently, as the cam swings (counterclockwise as viewed in Fig. 5) it at first has no effect upon the lever 85 and punch 83, and simply releases the finger 67 by carrying the stop 69 out of its path; finally, however, as the cam continues to swing, the incline 70° engages the roller 87 and depresses the lever 85, thereby driving the punch 83 down through the auxiliary record sheet. This makes in the sheet a hole which at a subsequent operation lets the contact 66 through, into engagement with the disk 81, with the results previously described.

At the several registrations by any given workman the novel drums are arrested at points successively nearer their normal or initial positions, but the collar or sleeve 27 must nevertheless continue to move on the shaft 14 in order to depress the printing devices and so print the time records. To permit this continued movement of the collar the lower arm of the lever 33—35 is made in two parts, pivoted together at 88 and formed with lugs 89, 90 adapted to abut against each other, as shown in Fig. 2, when the two parts of the arm are alined or in normal position with respect to each other. These two parts are held yieldingly in such normal position by a coil spring 91 (Fig. 3) encircling the pivot 88 and connected by its ends to studs 92, 93, on the said parts of the arm 35. Now when the record drums are arrested by the pawl 44 and rack 43 continued pressure on the handle 16 will continue to slide the collar 27 rearwardly, since the arm 35 will buckle at the joint between its parts against the tension of the spring 91; the latter being stiff enough to hold the arm rigid at the joint and so shift the drums until they are positively held by the pawl 44.

Referring now to Fig. 17, this figure represents diagrammatically the condition of things when the machine is ready for the registration to begin in the morning. The main record sheet 19ª and the auxiliary record sheet 62ª (connected by a lever, 94 and links 95, 96, shown diagrammatically) are at their initial positions, the points at which time-imprints are to be made on the first named record sheet, and the points at which holes are to be punched in the other being indicated by the short vertical lines 97, 98. Assuming that the record sheets (shown also in Figs. 8 and 9) are unmarked and that workman No. 4 desires to register, he turns the index lever 16 till the finger 17 is opposite aperture No. 4 (not shown) in the dial, thereby bringing line No. 4 on the main record sheet under the printing point and line No. 4 on the auxiliary record sheet under the punch 83. He then presses the finger 17 into the dial aperture. This movement starts the main record drum rearwardly and the auxiliary drum forwardly on their respective shafts 14 and 49, and instantly moves the stop 69 out of the path of the finger 67, thereby permitting the contact 66 to be depressed against the inner surface of the auxiliary record sheet. There being no holes in this sheet the drums continue to move until the tooth 43ª on the rack 43 meets the pawl 44. The drums are now arrested, in the morning-in positions shown diagrammatically in Fig. 18, but the collar 27 continues to move under the force exerted by the index lever 16, actuating the printing devices and making a time record opposite the number 4 on the main record sheet and in the first or the column nearest such number. This imprint may, for instance, be 6 59, as shown in Fig. 8, indicating that workman No. 4 arrived at 6:59 a. m. At the same time, the arm 80 continues to rock the shaft 71 thereby bringing the incline 70° and cam 70 into engagement with the lever 85. This depresses the lever and punches a hole 99, Fig. 18, in the record sheet. The recording operation is now completed, and upon release of the index lever by the workman the parts are restored to normal position. The next time the same workman registers the contact 66 comes down upon the auxiliary record sheet and the two drums continue to move until the hole 99, previously punched while the workman was registering for morning-in, comes under the impinging end of the contact. Instantly the latter strikes through the hole and completes the magnet circuit whereupon the pawl 44 is depressed into the path of the second tooth on the rack as shown in Fig. 19. The drums are thus arrested, and while the imprint is being made on the main record sheet the punch 83 makes another hole, 100, in the auxiliary record sheet alongside of the first hole, 99. The morning-out record is thus completed. At the next registration by the same workman the last hole, 100, causes arrest of the drums, and so on throughout the series of registrations, each printing or registering operation being accompanied by the punching of a new hole in the auxiliary sheet and the hole last made always serving to bring about the arrest of the drums at the next registration. Even at the registration for extra-out, a hole is punched so that if the workman tries to register again, perhaps thoughtlessly or with intent to obliterate the record made just before, the main record drum will not be arrested until the last made record has passed the impression point. The complete records have the appearance shown in Figs. 8 and 9, from which it is seen that to each imprint on the main record sheet corresponds a hole in the auxiliary sheet. Thus workman No. 6, who did not return for extra work has only four printed registrations and four punched records, while No. 8, who quit work at 12:04 p. m. has only two records of each type.

The circuit of the magnet is extremely simple. One pole of the source of current, diagrammatically indicated by the battery 101 in Fig. 17, is connected to a terminal of the magnet and the other to the brush or contact 66. The other terminal of the magnet is grounded by connection with a convenient part of the machine and the contact 81 is grounded by simply not insulating it from the supporting arm 73 but leaving it in electrical contact therewith.

In the weekly dial recorder illustrated in Figs. 10 to 14 inclusive many of the parts are similar in construction and operation to corresponding parts in the daily machine already described. The weekly machine comprises, in general, a casing 110 having on its front an annular dial 111 provided with an annular series of apertures, two of which are shown at 112, 113. At the center of this series of apertures is a shaft 114 extending toward the back of the machine and having an arm 114ª rigidly fixed to it at its front end, outside the casing. The front end of the shaft is tubular and mounted therein is a sliding stem 115, connected at its outer end to an index lever 116 pivoted at one end to the arm 114ª and at its other end having a rearwardly extending finger 117 adapted to enter any of the apertures, in the dial 111, to which it may be presented by revolving the index lever or printing handle and then pressing the same inwardly or toward the rear of the machine.

The apertures in the dial 111 are numbered and to each workman is assigned a number. Inside the machine is a drum 118, mounted to slide on the shaft 114 but to revolve therewith. Wrapped around this drum and clamped tightly in any convenient manner is a record sheet 119 bearing a circumferential column of workmen's numbers, the sheet being so placed on the drum that when any employee revolves the drum by means of the index lever or handle 116 to bring the pointer or finger 117 into register with the aperture corresponding to his number on the dial his number and line on the record sheet will be brought to the impression point. The machine being of the weekly type, the record sheet which receives the time imprints has at least six columns for the daily records and may in addition have, at its right hand side, columns in which the computed wages of the employees may be entered at the end of the week.

The other element of the printing couple comprises a carriage 120, suspended from and slidable on the rod 121 above and parallel to the record drum 118. Mounted in the carriage is a vertically movable frame indicated at 121ª. This frame carries the time printing wheels 122, and the ink ribbon 123, the time printing wheels being mounted to slide on a longitudinal square shaft 124 connected to the hour arbor of the clock 125 by means of a yielding joint 126 of suitable character to permit the said frame to be depressed and thereby make an imprint or time record on the record sheet.

At the beginning of the week the printing carriage 120 stands directly over the first day column on the record sheet 119, that is, the first day column at the right or back of the drum as viewed in Fig. 10, so as to make the various in-and-out records in that column, and provision is made as follows for daily shifting of the carriage toward the front of the machine to bring it over the next day column before registration for that day begins.

The carriage 120 is connected front and rear to a band 120ª passing over a pulley 120ᵇ at the rear and over a pulley 120ᶜ at the front. The latter pulley is connected to a spring-barrel, not shown, which revolves the pulley in the clockwise direction, as viewed in Fig. 10, thus sliding the carriage forward on the rod or support 121. The spring barrel and the pulley are geared to a vertical escapement shaft 120ᵈ having associated with it a clock-driven escapement which is merely indicated at 120ᵉ. Once each day, say at midnight, the escapement is released, permitting shaft 120ᵈ and pulley 120ᵇ to rotate, thereby drawing the printing carriage 120 one step forward on the supporting rod 121. Inasmuch as the mechanism described in this paragraph is not novel with us but is well known in the art, further illustration or description is deemed unnecessary. It may be stated, however, that a mechanism of this type is fully described in the prior patent of Robert Dey, No. 795,204, dated July 18, 1905.

On the shaft 114 near the front of the machine is a sliding collar 127 connected by a pin 128 to the sliding stem 115 through slots in the tubular portion of the shaft. When the workman pushes the index or finger 117 into the dial aperture to which his number is appropriated the inward movement of the stem slides the collar rearwardly on the shaft 114, thereby actuating a vertical lever 129 whose lower end lies in the path of the collar. The upper end of this lever engages and actuates a bent lever 130 the upper end of which overhangs and engages a swinging frame 131 which in turn engages and depresses the printing frame 121ª and so causes a time record to be made on the record sheet, as already described.

For the purpose of effecting the in-and-out spacing of the records, one or the other element of the printing couple—in the present case the drum—is made axially adjustable past the other, and means for adjusting the movable element are provided as follows: The collar 127 is provided with a circumferential groove 132 engaged by a yoke 130 or forked arm 133 fixed on a short transverse shaft 134 below the collar. Fixed to the same shaft is a depending arm 135, the two arms 133—135 constituting in effect a single lever. At its lower end this lever is pivotally connected to a rearwardly extending link 136 pivoted at its rear end to an arm 137 fixed to and depending from one end of a transverse rock shaft 138. Fixed to the other end of the shaft is an upwardly extending arm 139 (the arms 137—139 constituting in effect a single lever, like the arms 133—135 above mentioned) forked at its upper end and engaging a circumferential groove 140 in the hub 141 of the time record drum 118. It will now be seen that when the handle 116 is pressed inwardly by the workman the rearward movement of the collar 127 will cause a rearward axial movement of the time record drum, and of course with it the time record sheet 119, through the instrumentality of the levers 133—135, 137—139, and the link 136. It will also be seen that the drum will be shifted axially each time the collar 127 is actuated by the printing lever or manual 116, and that when the said lever is released the spring 142 will retract the moving parts to the normal or initial position shown in Fig. 10.

The normal or initial position of the time record drum 118 being that shown in Fig. 10, with the rear side of a day column at the impression point, it is evident that at the first registration by each workman in the morning the drum should be shifted forwardly a distance nearly equal to the width of the day column so as to place the first registration or time record for each man in the left-hand of the day column, and that succeeding adjustments for the same workman should be successively less in extent in order to space the records,—in other words, to effect the in-and-out spacing. To provide for these adjustments of successively less extent the arm 139, or upper portion of the lever 137—139, is formed with an arc-shaped or segmental rack 143, having six teeth corresponding to the six time records which can be made by the machine each day for each workman. Coöperating with this rack is a forwardly extending pawl 144 fixed on a short transverse rock shaft 145, to which is also fixed a finger 146 constituting an armature, conveniently mounted on the bracket 148 in which the rock shaft 138 is journaled and to one side of the path of the arm 139. It will now be seen that if this magnet is energized the pawl 144 will be depressed into engagement with one or another of the teeth on the rack 143 and that the pawl will then arrest or hold against rearward movement the arm 139 and time record drum 118. The particular tooth engaged by the pawl, and hence the point at which the drum is arrested or held, depends, of course, upon the instant at which the magnet is energized.

The construction and arrangement of the parts illustrated are such that to arrest the drum at the morning-in position, that is, at its extreme rearward position, the magnet 147 need not be energized, the last tooth, 143ª, being made high enough to engage the pawl 144 in the uppermost position of the latter, which by virtue of the spring 144ª it assumes when the magnet is deënergized. For the purpose of closing the magnet circuit at the proper instants to arrest or hold the drum at other points in its path the following devices are provided.

Below and parallel to the shaft 114 which carries the time record drum 118, or, as it may be appropriately termed, the main record drum in contradistinction to the auxiliary record drum now to be described, is a similar shaft 149 connected to shaft 114 by gears 150, 151, so as to turn synchronously with the other shaft but in the opposite direction. Mounted to slide axially on the shaft 149 but revolve therewith is a ring 152 having a hub 153 provided with a circumferential groove engaged by the forked lower end of an arm 155 depending from and fixed to the rock shaft 138, which, it will be remembered, is rocked by the inward movement of the index or printing handle 116. Consequently the ring 152 must move forwardly as the main record drum 118 moves rearwardly, and vice versa. Facing the ring 152 and encircling the shaft 149 is a similar ring 156 of exactly the same external diameter as the former but not hubbed on the shaft. Instead, the ring is revolubly and slidably mounted on a hollow cylindrical support 157, supported at the top by a bracket 158 and at the lower portion by two brackets one of which is shown at 158ª. The two rings are connected at one point in their periphery by a deeply grooved channel member 161. Around the two rings is wrapped the auxiliary record sheet 162, preferably a sheet or card of somewhat heavier or thicker stock than the main record sheet 119, the two ends of the auxiliary record sheet being bent down into the channel member 161 and secured tightly therein by a flat box or strip 163 which may be removed when it is desired to replace the old record sheet with a fresh one. The rings 152, 156 being connected by the channel 161 and by the tightly fitting auxiliary record sheet it will be seen that the two rings, and with them the record sheet, revolve and slide axially in unison or as one piece. The rings therefore constitute in effect a single drum, and can be appropriately referred to as the auxiliary record drum.

The upper arm 159 of the two armed rearwardly disposed bracket 160 is provided a its rear end with an alined lug 164 carrying at its rear end a pivot 165, and fixed to this pivot but insulated therefrom is a yielding electrical contact or brush 166. Fixed to the same pivot and extending upwardly is a finger 167 urged forwardly by a spring 168, the tendency of the spring being to depress the contact into engagement with the inner surface of the auxiliary record sheet. This movement of the contact is normally prevented, however, by a movable stop 169 on a quadrantal cam 170 fixed to the rear end of a rock shaft 171 which extends from the front of the machine rearwardly through the drum-supporting cylinder 157 and is at its rear end journaled in a standard 172 rising from the bracket arm 159. Hence when the shaft 171 is rocked (counterclockwise as viewed in Fig. 14) the stop 169 will be carried below the forwardly extending cam edge 167$^a$ of the finger 167, permitting the spring 168 to swing the finger forwardly and depress the contact 166 into engagement with the auxiliary record sheet. The shaft 171 at its forward end is provided with an arm 174 pivotally connected by a link 175 to an arm 176 on a stub shaft 177 which has also an arm 178 pivotally connected by a link 179 to an arm 180 fixed on the transverse rock shaft 134, which, it will be remembered, is rocked whenever the printing handle or index lever 116 is pressed in to make a time record. Consequently the shaft 171 is rocked and the contact 166 depressed at each printing actuation of the handle 116.

On the end of the lower arm 173 of the two-armed bracket 160 (which latter straddles the auxiliary record drum and sheet, as shown in Fig. 11) is a metal plate or disk 181, constituting a second electrical contact. The two contacts being in circuit with the electromagnet and the source of energizing current therefore, it will be seen that if, when the contact 166 is depressed, it finds in the path of its lower end an opening or hole in the auxiliary record sheet it will impinge on the second contact 181, thereby closing the circuit and causing energization of the magnet 147 with consequent actuation of the arresting pawl 44 and stoppage of main record drum 118 (as previously described) at a point in its path dependent upon the position of the hole in the auxiliary record sheet. Preferably the proportions of the parts which produce the axial reciprocation of the auxiliary record drum and the release of the finger 167 are such, in general, as to release the latter and permit the contact 166 to be depressed at practically the instant the said drum begins to move and before the hole in the auxiliary record sheet reaches the contact. The chief advantage of this arrangement is that at each operation the auxiliary record sheet rubs on the engaging end of contact 166 as well as on the face of the second contact 181. The coöperating portions of these parts are thus kept clean and bright and good electrical contact between the two is insured.

For the purpose of providing holes in the auxiliary record sheet, at proper distances apart, to permit coöperation of the contacts 66—81 and consequent arrest of the record drums as the same are shifted axially by the handle 116 the following devices are provided: The lower contact 81 is formed with an opening 182 and in addition to acting as an electrical contact serves as the female member of a punching die. Mounted in the upper arm 159 of the bracket 160 is a vertically movable stem 183, in alinement with the opening 182 and constituting the male member of the punching die. The member 183 is normally held in upper position by an encircling coil spring 184 but its upper end is engaged by a lever 185 pivoted at one end to a bracket 186 on the arm 159 and at its other end provided with an anti-friction roller 187 bearing against the edge of the quadrantal or segmental cam 170. The radius of this cam from the leading edge 170$^a$ to a point adjacent to the following edge is constant; but at the point referred to, the radius inverses, producing an incline 70$^c$, beyond which the radius is again constant. Consequently, as the cam swings (counterclockwise as viewed in Fig. 5) it at first has no effect upon the lever 185 and punch 183, and simply releases the finger 167 by carrying the stop 169 out of its path; finally, however, as the cam continues to swing, the incline 70$^c$ engages the roller 187 and depresses the lever 185, thereby driving the punch 183 down through the auxiliary record sheet. This makes in the sheet a hole which at a subsequent operation lets the contact 166 through, into engagement with the disk 181, with the results previously described.

At the several registrations by any given workman the record drums are arrested at points successively nearer their normal or initial positions, but the collar or sleeve 127 must nevertheless continue to move on the shaft 114 in order to depress the printing devices 121$^a$ and so print the time records on the main record sheet. To permit this continued movement of the collar the lower arm 135 of the lever 133—135 is made in two parts, pivoted together at 188 and formed with lugs 189, 190, adapted to abut against each other, as shown in Fig. 11, when the two parts of the arm are alined or in normal position with respect to each other. Like the parts of the lever 33—35 in the daily machine, Fig. 3, the two parts of arm 135 are held yieldingly in normal position by a coil spring encircling the pivot 188 and connected by its ends to studs on the said parts. Now when the record drums are arrested by the pawl 144 and rack 143 continued pressure on the handle 116 will continue to slide the collar 127 rearwardly, since the arm 135 will buckle at the joint between its parts against the tension of the spring; the latter being stiff enough to hold the arm rigid at the joint and so shift the drums until they are positively held by the pawl 144.

In so far as the weekly machine as described is similar to the daily machine illustrated in Figs. 1 to 7 inclusive the operation of the weekly machine is identical with that of the daily machine, and reference may therefore be made at this point to the description given above in conjunction with Figs. 8, 9, and 17 to 23 inclusive. It may be stated, however, that, as shown in Figs. 15 and 16, the main and auxiliary record sheets of the weekly machine are in effect equivalent to six record sheets of the daily machine arranged side by side.

In order to provide for the six day columns on the auxiliary record sheet 162 it is evident that either the auxiliary record drum, or the punching and contact mechanism, must be adjusted each day. To adjust the latter is the preferable method, and accordingly the two-armed bracket or yoke 160, which carries said mechanism, is mounted to slide on a pair of rails 160$^a$ and is connected front and rear to a band 160$^b$ passing over front and rear pulleys 160$^c$ and 160$^d$, of the same diameters as the pulleys 120$^c$ and 120$^b$, respectively, which coöperate with the printing carriage propelling band 120$^a$. The front pulley 160$^c$ is on a shaft 160$^d$ to which is also fixed a gear 160$^e$ meshing with a gear 160$^f$ on the lower end of the vertical shaft 120$^d$, which, it will be remembered, is released once a day by the escapement 120$^e$. The gears on the shaft 120$^d$ being on opposite sides of the gears with which they intermesh it will be seen that the punching and contact mechanism is adjusted axially once each day in synchronism with the main record drum 118 but in the opposite direction. That is, the punching and contact mechanism travels from a normal or initial position at the front of the machine, as shown in Figs. 10 and 11, to an extreme rearward position, while the main record drum travels from an initial position at the rear to an extreme forward position. The punching and contact mechanism is thus brought each day into register with the appropriate day column on the auxiliary record sheet.

Our invention is also applicable to time recorders of the so-called card type. In the preferred mode of applying the invention to this class of recorders we dispense with the auxiliary record sheet and provide a construction in which the main record sheet or card, on which the time records are printed, serves both purposes. A convenient and effective embodiment of the invention in this form is illustrated in Figs. 24 to 37 inclusive, to which reference is now made.

As before stated, the record sheet in a card machine is preferably in the form of a stiff card, for example as shown in Fig. 30, having horizontal columns for the several days of the week and vertical columns for the in-and-out records. In the machine illustrated this card, when a registration is to be made, is inserted, with the face of the card toward the rear, into a vertical chute or card-receiver 201 in the form of an open framework composed of grooved side members 202 and a flaring top 203, the card fitting the receiver rather closely so as to have but little if any play therein. The receiver or record sheet support 201 is mounted to slide horizontally and transversely on upper and lower rails 204, 205, to move the card sidewise past the impression point, thus giving the in-and-out spacing, while the day-spacing is produced by varying the depth to which the card is inserted in the receiver. For the latter purpose the bottom of the chute is in the form of an abutment or card-lift 206 carried on the forward end of an arm or lever 207 pivoted at its rear end and having a pin 208 resting on a double cam 209. This cam is revolved by or under the control of the clock (not shown) at such a rate as to make one complete revolution in two weeks, and its movement is step-by-step so that at the proper instant 206 will be raised far enough to cause a new day line to stand at the impression point when the cards are again inserted in the receiver. The clock and the cam actuating mechanism are not illustrated herein but they are fully described in the prior patent of C. E. Larrabee, No. 771,494, to which reference may be made if it is desired to construct a machine of this type. Suffice it to say that the abutment 206, lever or arm 207, and cam 209 in the present embodiment constitute clock-driven or clock-controlled means for effecting the day-spacing. The printing wheels are indicated diagrammatically at 210, Figs. 26 and 27, and are also clock-driven or clock-controlled by suitable mechanism not shown herein but fully described in the Larrabee patent mentioned. The printing wheels are arranged behind the card receiver 201 near the top thereof and between the wheels and the receiver is an ink ribbon 211 mounted on spools 212. The printing hammer 213 is in front of the receiver, and when thrown rearward carries the card and ribbon smartly against the type wheels, thereby printing a time record on the card in a space thereon determined by the vertical and lateral adjustment of the card, as will be readily understood.

The vertical printing hammer 213 is pivoted at its lower end in a forked arm 214 fixed on a horizontal transverse shaft 215 and is held yieldingly in a forward position, well out of contact with the card in the receiver by a spring 216. Loose on the shaft 215 is a manual operating lever or handle 217 which the workman actuates to effect a registration, and pivoted on the lever or handle is a trip finger 218 arranged to engage a finger 219 rigidly mounted on shaft 215. Fast to the same shaft is an arm 220, connected by a spring 221 which urges the shaft in the clockwise direction (as viewed in Fig. 26) and hence tends to throw the hammer 213 toward the card receiver 201.

From the foregoing it will be seen that on depressing the lever or handle 217 the pawl or hooked finger 218, engaging the finger 219, will advance the same, thereby rocking the shaft 215 and drawing back the hammer. As the lever is depressed the depending tail 222 of the finger 218 engages a cam-stop 223, with the result that the finger or pawl 218 is swung out of engagement with the finger 219, whereupon the spring with the finger 221 instantly rocks the shaft 215, bringing the hammer to the position shown in Figs. 26 and 27. The hammer being of suitable weight, its momentum is sufficient to carry it beyond this point against the tension of the spring 216 and cause it to strike a sharp blow upon the card, ink ribbon, and type wheels. The blow having been struck and a time imprint thereby made on the card, the hammer is instantly restored to normal position by the spring 216.

To provide for the in-and-out spacing the card receiver or record sheet supporting device is, as previously stated, adjustable past the impression point. Pivoted by one end to one side of the receiver near the top thereof is a link 224 in the form of a broad, inverted U, pivoted at its other end to a lever 225 fulcrumed at 226 and engaging with its notched lower end a cam rib 227 (Fig. 28) on a cam member 228 parallel with the shaft 215 and rigidly connected at its ends to the printing lever 217 and an arm 229 on the same shaft. Consequently, as the printing lever is depressed the cam rib 227 will swing the lever 225 counterclockwise (as viewed in Fig. 24), thereby sliding the card receiver 201 leftward on the rails 204, 205. The leftward movement of the receiver is limited by the stop 230, in which the top rail 204 is mounted, and when the receiver is in this extreme leftward position the morning-in column on the record sheet or card is opposite the type wheels, that is, at the impression point. To arrest the receiver at other points in its path, successively nearer to the initial or extreme rightward position of the receiver, the lower portion of the receiver is fitted with a downwardly disposed rack 231, having five teeth adapted to coöperate with a pawl 232 pivoted at 233 and having a depending arm 232ª constituting the armature of an electromagnet 234. The pawl is normally held out of the path of the rack by a light spring 235, but when the magnet is energized the pawl is swung up against the rack and by engagement with a tooth on the rack arrests or holds the receiver; the point at which the receiver is arrested or held depends of course on the particular tooth engaged, which in turn depends upon the time at which the pawl is actuated.

On a lug 236, formed on the plate 237 on which the receiver-shifting lever 225 is fulcrumed, is a spring contact or brush 238, tending constantly to press against the record card in the receiver but normally held away from the plane of the card by a non-conducting finger 239 mounted on a lever 240 fulcrumed at 241, on the plate 237. The lower arm of this lever coöperates with a leftwardly extending stop or finger 242 carried by a short standard or arm 243 extending upwardly from the printing handle 217 so that when the handle is in its normal or elevated position the finger 239 will hold the spring contact or brush 238 away from the plane of the record sheet. When, however, the printing handle is depressed to make an imprint on the record card the simultaneous forward movement of the stop 242 permits the lower end of lever 240 to follow and hence allows the contact 238 to swing rearwardly against the record card, as will be readily understood.

The contact 238, as will be noted, is below the ink ribbon 211, and in horizontal alinement with the contact, but in rear of the record card in the receiver is a support 244 in which is secured a second contact in the form of a metal plate 245. The two contacts, the magnet 234, and a source of current indicated at 246, being in series, it will be apparent that if, when the contact 238 is released it finds an opening in the record card (a card in position in the receiver is shown at 201ª in Fig. 29) it will strike the contact 245 through the card and so close the magnet circuit, whereupon the magnet is energized and the armature 232ª actuated. This swings the pawl 232 up against the rack 231 and arrests or holds the card receiver, as previously described.

For the purpose of providing suitable holes in the record card at proper distances apart to cause the arrest of the card receiver 201 with the appropriate in-and-out columns at the impression point the following devices are provided: The lug 236 supports a depending bracket 247 carrying a vertical plate 247ª provided at its top with forwardly and rearwardly alined lugs 248 in which is slidably mounted a stem 249 constituting the male member of a punching mechanism. This punch 249 has a collar or stop 250, and between said collar and the rear lug 248 the punch is encircled by an expansion coil spring 251 which serves to urge the punch toward the front of the machine. On its front face the collar 250 is engaged by the forked upper end of an arm 252 fixed on a short shaft or pivot mounted in the lower portion of the plate 247$^a$, said arm being on the left side of the plate as viewed in Fig. 24. On the opposite side of the plate is an arm 253, also fixed to said pivot or shaft, having its upper end in the path of an adjustable stop 254 (Fig. 27) in a lug 255 on the side of the printing hammer 213. It will therefore be seen that as the hammer 213 swings forward to make an imprint on the record sheet or card the stop 254 will engage and swing the arm 253 forward, thereby rocking the shaft to which the arm is fixed and causing the arm 252 to actuate the punch 249 through the instrumentality of the collar 250 with which said arm 252 engages. In exact alinement with the punch 249 the contact 245 is provided with an aperture 256, thus making the part 245 serve not only as a contact but also as the female member of the punching mechanism.

From the foregoing it will be seen that as the printing hammer moves toward the rear of the machine to make the imprint on the record card in the receiver the stop 254 will swing the arm 252 in the same direction, thereby actuating the stem 249 and punching a hole in the record card. It will also be seen that the punching mechanism is actuated each time an imprint is made on the record card, regardless if the card is in its lowermost or uppermost or any intermediate position in the receiver.

By referring to Fig. 28 it will be seen that the cam rib 227, which serves to clutch the lever 225 and thus shift the card receiver 201 horizontally past the impression point, has a slight dwell 257 at its forward end. The result of this construction is that for an instant after the handle 217 begins to move downwardly to operate the recorder the lever 225 is not actuated and the card receiver does not move. Nevertheless the stem 243, carried by the printing handle, moves forwardly with the handle and permits the contact 238 to impinge on the record card. As the downward movement of the handle continues the receiver 201 starts, rubbing against the contacts 238 and 246 and thereby keeping the same clean and bright. As soon as a hole in the card comes under the contact 238 the latter strikes through and against the contact 246, thereby closing the circuit of the magnet 234 and causing the receiver 201 to be arrested.

Referring now to Figs. 31 to 37 inclusive, which illustrate the operation diagrammatically, Fig. 31 shows the parts in the normal or initial position, with the receiver 201 at the extreme right of its path as viewed from the front of the machine. When a workman, arriving in the morning of the first working day of the week depresses the lever or handle to make his morning-in record, the first effect is to throw the contact 238 against the record card. The card receiver then moves toward the left, and inasmuch as the card has no holes in the horizontal line moving past the contact the receiver shifts to its extreme leftward position, shown in Fig. 32, bringing the morning-in column opposite the impression point and the punch. As the printing hammer strikes the card, carrying the same against the ink ribbon and the time-printing wheels, the punch 249 is actuated, punching a hole 260 in the card 201$^a$. Upon the release of the printing lever the spring 221 (Fig. 24) restores the parts to normal position. The next time the same workman registers, the contact is thrown against the card as before and the receiver moves toward the left, but as it approaches the morning-out position the hole 260 comes into register with the tip of the contact 238, whereupon the latter strikes through the hole and against the second contact 245, closing the circuit of magnet 234 which then actuates the pawl 232 and arrests the receiver, with the morning-out column opposite the printing point and the punch 249. The printing handle must, however, continue to move downwardly to complete the recording operation, and to permit such continued movement the lever 225, which, it will be remembered, shifts the card receiver, is divided into two parts pivoted together at 261, the parts being formed with lugs 262 which abut when the parts are in alinement. Encircling the forwardly extended end of the pivot is a coil spring 263 connected by its ends to the studs 264 on the lever parts. Now when the receiver is arrested by the pawl 232 the printing lever can continue its downward movement, the lever 225 simply buckling at the joint 261 against the tension of the spring 263, which latter restores the lever parts to alinement or normal position as, or as soon as, the force exerted by the cam rib 227 ceases to act. It will thus be seen that at the morning-in position a record is printed and at the same time a hole 265 is punched in the card, which serves to arrest the receiver at the afternoon-in position at the next registration by the same workman. Similarly, at each succeeding registration a hole is punched, making six in all for the particular day if the employee comes in at night or for overtime, the six positions of his card, for morning-in, morning-out, afternoon-out, extra-in, and extra-out, being shown in Figs. 32 to 37 respectively. Before the beginning of the next day's work the abutment or card-lift 206 is raised, so that at the next insertion of the card it will not sink to the same depth as on the first day, but will drop just far enough to bring the day-lines for the second day for example Tuesday, opposite the impression point and the contact 238. At the end of the week the card will look something like that shown in Fig. 30, with a hole for each and every time-imprint, the several imprints and the corresponding holes having determined positions with respect to each other. Thus hole 260 corresponds to the Monday morning-in imprint, hole 265 corresponds to the Monday morning-out imprint, and hole 266 to the Friday afternoon-in record.

From the foregoing it will be seen that while the machines herein described differ specifically in many respects they all embody the same principles of operation. For example, although in these present machines the record sheet which bears the holes has to be renewed periodically, such sheet is nevertheless an operative element of the machine, since without the sheet or an equivalent the record-sheet support cannot be shifted. This results from the fact that when the card or sheet is omitted there is nothing to prevent closing of the contacts, with the record-sheet support in normal or initial position, whenever the printing handle is actuated. Again, the machine manufactures its own controlling devices, so to speak, by punching the holes in proper relation to the portions of the time record sheet which are to receive the imprints, and does not "set up" one or another of a series of devices which are individual to the respective workmen. The devices which directly coöperate to arrest or hold the record sheet support at the proper points in its path are never left set up or arranged for a succeeding registration but are always restored to an initial or normal position and are actuated prior to the next registration by an external source of power (in the present instance electric power) instead of by the force exerted by the workman in operating the machine. These principles are characteristic of our invention, but it is not essential that they all be employed, as the question whether one or another or all are to be utilized depends for its answer largely upon the specific design of the machine to which the invention is to be applied and the specific manner in which the invention is to be incorporated therein.

What we claim is:

1. In a time recorder, the combination of a record sheet; a supporting element therefor; an element having a controlling device adapted to bear against the record sheet; means for moving one of said elements relatively to the other; mechanism arranged to arrest the movable element and dependent for operation upon movement of the controlling device through the record sheet; and means for perforating the record sheet while the movable element is arrested, to permit movement of the controlling device through the perforation thus made, when the first named means is next operated.

2. In a time recorder, the combination of a record sheet; a supporting element therefor; an element having controlling devices arranged on opposite sides of the record sheet and normally separated thereby; means for moving one of said elements relatively to a given point; mechanism associated with the controlling devices and dependent for operation upon the coöperation of said devices, to arrest the movable element; and means for perforating the record sheet while the movable element is arrested, to permit the controlling devices to coöperate, through the perforation thus made, at the next movement of the movable element.

3. In a time recorder, the combination of a record sheet; a supporting element therefor; an element having an electrical contact arranged at one side of the record sheet and adapted to bear against the same; means for moving one of said elements relatively to the other; a contact arranged at the other side of the record sheet so as to be separated from the first named contact by the record sheet; mechanism, including an electromagnet in circuit with said contacts, to arrest the movable element when the electromagnet is energized; and means for perforating the record sheet while the movable element is arrested, to permit engagement of the contacts, through the perforation thus made, with consequent energization of the said electromagnet, when the element-moving means is next operated.

4. In a time recorder, the combination of a record sheet; a support therefor; means for moving the support relatively to a given point; controlling devices arranged on opposite sides of the record sheet and normally prevented thereby from coöperation; mechanism arranged to arrest the said support and dependent for operation upon coöperation of said controlling devices through the record sheet; and means for perforating the record sheet while the support thereof is arrested, to permit coöperation of the controlling devices through the perforation thus made, when the first named means is next actuated.

5. In a time recorder, the combination of a record sheet; a supporting element therefor; an element having a controlling device adapted to bear against the record sheet; manually actuated means for moving one of said elements relatively to the other; power actuated mechanism arranged to arrest the movable element and dependent for operation upon movement of the controlling device through the record sheet while the support thereof is arrested, to permit movement of the controlling device through the record sheet when the manually actuated means is next operated.

6. In a time recorder, the combination of a record sheet; a supporting element therefor; an element having controlling devices arranged on opposite sides of the record sheet and normally operated thereby; manually actuated means for moving one of said elements relatively to the other; power actuated mechanism arranged to arrest the movable element and dependent for operation upon coöperation of the controlling devices; and means for perforating the record sheet while the support thereof is arrested, to permit coöperation of the controlling devices through the perforation thus made, when the manually actuated means is next actuated.

7. In a time recorder, the combination of a record sheet; a supporting element therefor; an element including electrical contacts on opposite sides of the record sheet and normally separated thereby; means for moving one of said elements relatively to a given point; mechanism, including an electromagnet in circuit with said contacts, to arrest and hold the movable element at successive points in its path; and means for perforating the record sheet while the movable element is arrested, to permit the contacts to engage through the perforation thus made, at the next movement of the movable element.

8. In a time recorder, the combination of a record sheet; a support therefor, movable relatively to a given point; electrical contacts at said point and on opposite sides of the record sheet, and normally separated thereby; mechanism, including an electromagnet in circuit with said contacts, to arrest and hold the record sheet support at successive positions in its path; mechanism adjacent to said given point for perforating the record sheet while the said support is arrested, to permit engagement of the contacts through the record sheet; and means for moving the record sheet support, whereby engagement of the contacts will be effected through the perforation last made in the record sheet, with consequent operation of the aforesaid arresting mechanism.

9. In a time recorder, the combination of a record sheet support; a record sheet carried thereby; controlling devices on opposite sides of the record sheet and normally separated thereby; mechanism for moving the record sheet support relatively to a given point; means to arrest the record sheet support at successive points in its path, with successive portions of the record sheet at the given point; mechanism for perforating the record sheet at such successive portions while arrested, to permit later coöperation of the controlling devices through the record sheet; manually operated means for actuating the said mechanisms; and an independent source of power controlled by said controlling devices and associated with the arresting means to actuate the latter.

10. In a time recorder, the combination of a record sheet support movable relatively to a given point; a record sheet carried by the support; rack and pawl mechanism associated with the support to arrest the latter at successive points in its path with successive portions of the record sheet at the given point; a controlling device adapted to bear on the record sheet; means, dependent for operation upon movement of the controlling device through the record sheet, to actuate the pawl; and mechanism for perforating the record sheet while the same is arrested, to permit later movement of the controlling device through the record sheet with consequent actuation of the pawl and arrest of the record sheet.

11. In a time recorder, the combination of a supporting element and a record sheet carried thereby; an element provided with means for perforating the record sheet and with electrical contacts adapted to coöperate through perforations thus made in the record sheet; means for moving one of said elements relatively to the other to effect the in-and-out spacing of the time records; mechanism for arresting and holding the movable element at successive points in its path; an electromagnet in circuit with said contacts and associated with the arresting mechanism to actuate the latter; and devices connecting the manual means and the perforating means to actuate the latter by the former while the movable element is arrested.

12. In a time recorder, the combination of a record sheet; a support therefor, movable relatively to a given point; a rack connected with the support and movable therewith; a pawl adapted to engage the rack and arrest the rack and the support; an electromagnet to actuate the pawl; contacts in circuit with the electromagnet, arranged on opposite sides of the record sheet and normally separated thereby; perforating mechanism at said given point to perforate the record sheet while the same is arrested, whereby the contacts may at a succeeding movement of the record sheet coöperate through a perforation thus made; and manual means for moving the record sheet support and the rack.

13. In a time recorder, the combination of a record sheet, and manual means for moving the same relatively to a given point;

contacts arranged to bear on opposite sides of the record sheet; an electromagnet in circuit with the contacts; mechanism actuated by the electromagnet to arrest the record sheet at successive points in its path; and mechanism operating at said given point and actuated by the said manual means to perforate the record sheet while the same is arrested, whereby at a succeeding movement of the record sheet the contacts may coöperate through a perforation in the record sheet to close the magnet circuit, with consequent arrest of the record sheet.

14. In a time recorder, the combination of a record sheet movable relatively to a given point; contacts on opposite sides of the record sheet; manual means for moving the record sheet and for causing one of the contacts to bear on the record sheet as the same moves; mechanism, including an actuating electromagnet in circuit with the contacts, to arrest the record sheet at successive points in its path; and a punch operating at the given point and actuated by the said manual means to perforate the record sheet while the same is arrested, whereby at a succeeding actuation of said manual means the said contacts may coöperate through a perforation in the record sheet to close the circuit of the electromagnet with consequent arrest of the record sheet.

15. In a time recorder, the combination with a record sheet, and manual means for moving the same from an initial position; of means under the control of the record sheet for arresting the same at successive points in its movement from the initial position; and means for returning the record sheet to the initial position after actuation of said manual means.

16. In a time recorder, the combination with a record sheet, and manual means for moving the same from an initial position; of mechanism for arresting the record sheet at successive points in its movement from the initial position; mechanism for perforating the record sheet while the same is arrested; a controlling device for the arresting mechanism operable through perforations in the record sheet to set the arresting mechanism in operation; and means for returning the record sheet to its initial position after actuation of the manual means.

17. In a time recorder, the combination of a time-printing element, a record sheet supporting element, means for moving one of said elements toward and from the other to effect the printing of time records, and means for moving one of said elements past the other to produce the spacing of the time records; of an auxiliary record sheet movable in correspondence with the space-producing element; and mechanism under the control of the auxiliary record sheet to arrest the space producing element at successive points in its path.

18. In a time recorder, the combination with a record sheet support, revoluble to bring to the impression point spaces appropriated to the different workmen and movable axially past the impression point to space the time records for each workman; of an auxiliary record sheet; a support therefor movable revolubly and axially in correspondence with the first named support; and means under the control of the auxiliary record sheet for arresting both supports at successive points in their axial paths.

19. In a time recorder, the combination with a revoluble record sheet support movable axially to space the time records; of an auxiliary record sheet; a revoluble support therefor, connected with the first named support to move revolubly and axially in correspondence therewith; mechanism to arrest both supports at successive points in their axial paths; and an electromagnet to actuate the arresting mechanism, under the control of the auxiliary record sheet.

20. In a time recorder, the combination of a record sheet; a revoluble supporting element therefor; a controlling element adapted to bear on the record sheet; means for moving one of said elements past the other in a rectilinear path; mechanism to arrest the rectilinearly movable element at successive points in its path and dependent for operation on movement of the controling element through the record sheet; and means for perforating the record sheet while the said movable element is arrested, to permit later movement of the controlling element through the record sheet.

21. In a time recorder, the combination of a record sheet; a revoluble and axially movable support for the record sheet; a contact adapted to bear on one side of the record sheet; a contact on the other side of the record sheet; an electromagnet in circuit with the contacts; mechanism actuated by the electromagnet to arrest the record sheet support at successive points in its axial path; and mechanism for perforating the record sheet while the same is arrested, whereby at a succeeding axial movement of the record sheet and support the contacts may coöperate to close the magnet circuit.

22. In a time recorder, the combination of a record sheet support; a record sheet wrapped cylindrically around the support and carried thereby; means for moving the support axially past a given point; mechanism to arrest the support at successive points in its path with successive portions of the record sheet at said given point; contacts on opposite sides of the record sheet and normally separated thereby; an electromagnet in circuit with the contacts and associated with the arresting mechanism to actuate the same; and means at said given point for perforating the record sheet while the same is arrested, whereby the contacts may at a succeeding movement of the record sheet coöperate through the perforation to close the magnet circuit.

23. In a time recorder, the combination with a main record sheet support, and means for moving the same past the impression point to space the time records; of an auxiliary record sheet support; an auxiliary record sheet carried thereby; a lever connecting the supports to cause the same to move synchronously; and mechanism under the control of the auxiliary record sheet coöperating with the lever to arrest the supports at successive points in their paths.

24. In a time recorder, the combination with a shaft, a record drum rotatable with the shaft and movable axially thereon, and means for making time records on a record sheet mounted on the drum; of a second shaft, parallel to the first; a cylindrical record sheet support on the second shaft, rotatable therewith and movable axially thereon; a record sheet arranged cylindrically on the said support; means connecting the two shafts whereby the two will rotate in unison; a lever connecting the drum and the support to move the two axially in unison; a rack carried by the lever; a pawl adapted to engage the rack to arrest the drum and the support at successive points in their paths; and pawl-actuating mechanism under the control of the auxiliary record sheet.

25. In a time recorder, the combination of a record sheet supporting element; a record sheet carried thereby; controlling devices coöperating with the record sheet; an element carrying the controlling devices; time-controlled mechanism for shifting one of said elements relatively to the other; means for moving one of said elements relatively to the other to effect the in-and-out spacing of the time records; and mechanism dependent for operation upon the controlling devices to arrest the last mentioned movable element at successive points in its path.

26. In a time recorder, the combination of a record sheet supporting element; a record sheet carried thereby; a controlling device adapted to bear on the record sheet; a punching device adapted to perforate the record sheet; an element carrying the said devices; time-controlled means for shifting one of said elements relatively to the other; mechanism for moving one of said elements relatively to the other to effect the in-and-out spacing of the time records; and mechanism for arresting the last-mentioned movable element at successive points in its path and dependent for operation upon movement of the said controlling device through a perforation in the record sheet.

27. In a time recorder, the combination of a record sheet support; a record sheet carried thereby; controlling devices coöperating with the record sheet; time-controlled means for shifting the controlling devices step-by-step relatively to the other to effect the day spacing of the time records; means for moving the record sheet support relatively to the controlling devices to effect the in-and-out spacing of the time records; and mechanism controlled by said controlling devices to arrest the record sheet support at successive points in its path.

28. In a time recorder, the combination of a record sheet support; a record sheet carried thereby; means for moving the record sheet support to effect the in-and-out spacing of the time records; mechanism, including an actuating electromagnet, to arrest the record sheet support at successive points in its path; contacts in circuit with the electromagnet and controlled by the record sheet to control the operation of the electromagnet; and time-controlled means for shifting the contacts step-by-step to effect the day spacing of the time records.

29. In a time recorder, the combination of a record sheet supporting element; contact devices adapted to bear on the record sheet; a punch adapted to perforate the record sheet; an element carrying the contact devices and the punch; time-controlled means for shifting one of said elements step-by-step relatively to the other to effect the day spacing of the time records; means for moving one of said elements relatively to the other to effect the in-and-out spacing of the time records; mechanism to arrest the last mentioned movable element at successive points in its path; and an actuating electromagnet for said mechanism, in circuit with the contact devices and energizable upon coöperation of the latter through a perforation in the record sheet.

30. In a time recorder, the combination of a record sheet support; a record sheet carried thereby; means for moving the record sheet support from an initial position to effect the in-and-out spacing of the time records; mechanism for arresting the support at successive points in its path; devices for perforating the record sheet while the same is arrested; contacts adapted to bear on opposite sides of the record sheet and to coöperate through a perforation in the same; an electromagnet in circuit with the contacts to actuate the arresting mechanism; and means for shifting the perforating devices and the contacts step-by-step from an initial position to effect the day spacing of the time records.

31. In a time recorder, the combination of a main record support; time printing devices for making time records on a main record sheet carried by said support; an auxiliary record sheet support; an auxiliary record sheet carried by the auxiliary support; controlling devices associated with the auxiliary record sheet and adapted to cooperate therewith; time controlled mechanism for shifting the time printing devices and the controlling devices relatively to the respective record sheet at predetermined intervals; manual means for moving the record supports relatively to the time printing devices and the controlling devices; and automatic mechanism under the control of the controlling devices and auxiliary record sheet to arrest the record supports at successive points in their paths.

In testimony whereof we affix our signatures in the presence of two subscribing witnesses.

HARRY T. GOSS.
JAMES W. BRYCE.

Witnesses:
WILLIAM P. JOHNSON,
S. S. DUNHAM.

Copies of this patent may be obtained for five cents each, by addressing the "Commissioner of Patents, Washington, D. C."